Oct. 13, 1953 J. H. HOMRIGHOUS 2,655,652

MULTIPLEX TIME DIVISION TELEPHONE SYSTEMS

Filed June 28, 1948 7 Sheets-Sheet 1

INVENTOR.

John H. Homrighous

MULTIPLEX TIME DIVISION TELEPHONE SYSTEMS

Filed June 28, 1948 7 Sheets-Sheet 2

INVENTOR.
John H. Homrighous

MULTIPLEX TIME DIVISION TELEPHONE SYSTEMS

Filed June 28, 1948 7 Sheets-Sheet 3

INVENTOR.

John H. Homrighous

Oct. 13, 1953 J. H. HOMRIGHOUS 2,655,652

MULTIPLEX TIME DIVISION TELEPHONE SYSTEMS

Filed June 28, 1948 7 Sheets-Sheet 4

INVENTOR.

John H. Homrighous

Oct. 13, 1953 J. H. HOMRIGHOUS 2,655,652

MULTIPLEX TIME DIVISION TELEPHONE SYSTEMS

Filed June 28, 1948 7 Sheets-Sheet 5

INVENTOR.

John H. Homrighous

Oct. 13, 1953 J. H. HOMRIGHOUS 2,655,652

MULTIPLEX TIME DIVISION TELEPHONE SYSTEMS

Filed June 28, 1948 7 Sheets-Sheet 6

INVENTOR.

John H. Homrighous

Oct. 13, 1953 J. H. HOMRIGHOUS 2,655,652

MULTIPLEX TIME DIVISION TELEPHONE SYSTEMS

Filed June 28, 1948 7 Sheets-Sheet 7

INVENTOR.

John H. Homrighous

Patented Oct. 13, 1953 2,655,652

UNITED STATES PATENT OFFICE

2,655,652

MULTIPLEX TIME DIVISION TELEPHONE SYSTEMS

John H. Homrighous, Oak Park, Ill.

Application June 28, 1948, Serial No. 35,615

29 Claims. (Cl. 343—204)

This invention relates in general to communication systems and more particularly to two-way time division multiplex carrier wave transmission systems.

One of the main objects of my invention is to provide improved means for long distance dialing over a carrier wave comprising a separate time division channel through the carrier wave for transmitting pulses of dialing signals according as a calling device is rotated to selectively actuate machine switching equipment and to thereafter maintain the relay energized to hold the machine switching equipment in its operated condition.

An object of my invention is to provide improved means for the transmission and reception of a plurality of two-way messages over carrier waves between different telephone offices.

Another object is to provide means in a telephone office to transmit dialing signal pulses over a part-time carrier wave path or in recurring periods of time to actuate machine switching equipment in a distant telephone office for establishing a communication path to a telephone subscriber.

To provide a carrier wave for the transmission of a number of different trains of dial signal pulses for actuating machine switching equipment in a distant office to establish two-way communication paths over one or more carrier waves for communication between telephone subscribers in different telephone offices is another object of my invention.

Another object is to provide a multichannel part-time carrier wave path for signaling and communication including dial pulse signals.

Still another object of my invention is to provide means wherein a machine switching telephone subscriber may automatically establish part-time carrier wave paths to another telephone subscriber in a distant office.

To provide an improved telephone system wherein fragmentary portions of alternating current signals may be transmitted over a separate channel in a multichannel carrier wave path to maintain a line or pulsing relay in a distant office energized, or intermittently energized according as the alternating current is interrupted by manipulation of a dial in accordance with the number of a desired telephone subscriber is another object of my invention.

Another object is to provide improved means to establish communication paths over carrier waves for the transmission and reception of a plurality of two-way messages.

Another object of my invention is to provide improved means for eliminating transmission noise caused by static, ignition systems, cross modulation, etc.

Another object is to provide an improved communication system, wherein signals representative of a plurality of two-way messages may be transmitted in recurring periods of time over common carrier waves without overlapping for secret communication.

A further object of my invention is to provide multipath carrier waves with multichannels per path for message, dialing and supervisory signals.

To provide for maximum utilization of the carrier wave facilities in a communication office to thereby increase the number of messages that may be transmitted is a further object of my invention.

Still other objects are to provide additional services over telephone facilities: first, to automatically select, by manipulation of a dial, a communication path from a teletype subscriber's station in one office area to another teletype subscriber's station in a second office area through machine switching equipment including time division carrier wave channels for thereafter transmitting space and mark code signals through the selected path for actuating the teletypewriter at the called station; second, to automatically select a communication path from a calling telephone station through machine switching equipment to a desired distant station having a signal recording device, whereby a message from the calling station may be recorded.

Another object is to provide means for transmitting a plurality of different signals in successive rotation over a carrier wave such as message signals representative of a number of different communications, dialing signals for selecting different machine switching trunks, and supervisory or control signals for informing an operator if subscriber disconnects and to actuate registering devices for billing purposes.

An additional object is to provide means for automatically routing calls to distant offices via radio or wire transmission paths.

To provide relay or repeater stations for reamplifiying amplitude modulated signals without remodulation is another object of my invention.

A message in this specification is to be understood to include any intelligence or any portion of any intelligence representative of voice controlled electrical signals and coded electrical signals.

A channel in this specification is to be understood as a track or course for the transmission of electrical signals between distant stations, or a track or course for the transmission of electrical signals during recurring periods of time, and may be one of a number of channels in a transmission path for the transmission of signals representative of any intelligence.

A communication path in this specification is to be understood as comprising a plurality of channels for the transmission of message and related signals.

Several messages may be transmitted simultaneously over a wire trunk line by providing a different carrier wave for each message, and each carrier wave may be utilized for the transmission and reception of at least two messages on a time division basis as shown in my application Serial No. 545,206, filed July 17, 1945, now Patent Number 2,472,705, issued June 6, 1949. In the instant invention samples of the signals for a number of different messages are transmitted in successive rotation by space transmitters or over a wire line together with dial signal pulses, whereby communication paths may be automatically established between telephone subscriber stations and/or radio stations over transmission paths through a common carrier wave.

In the present multipath, multichannel per path carrier wave communication system, I develop timing pulses at each office, under control of synchronizing signals produced in only one office and transmitted to the other offices in the system, to control the transmission and reception of message signals in recurring periods of time.

The time division communication system of the present invention is applicable to many communication services by wire line or wireless transmission such as telephone networks, telegraph networks, teletypewriter or printing telegraph networks, and from the description to follow, it will be apparrent that there are many other possibilities.

The instant communication system may comprise a plurality of telephone or telegraph offices interconnected by multipath, multichannel per path, carrier wave wire lines, or space transmitters may be utilized at each of the offices to transmit message signals during recurring periods of time. A two-way path may comprise one channel for the transmission of message signals, a second channel for the reception of message signals, and other channels for supervisory and dialing signals as required. In general a channel may be provided for each separate function performed. One carrier wave may be employed for a plurality of different message paths, and each wire line may utilize means for transmitting different carrier waves simultaneously so that a greater number of messages may be carried by each wire line.

It is to be understood that the wire or trunk lines, which may comprise coaxial cable, may be utilized to transmit modulated message signals on a carrier wave or single side band transmission may be employed.

The space transmitters may employ high or ultra high frequency carrier waves, amplitude or frequency modulated. However, it is to be understood that the principles involved may be equally applicable to carrier waves of any other wave length.

Other objects and advantages of my invention will appear from the following description taken in connection with the accompanying drawings in which.

Figure 1:
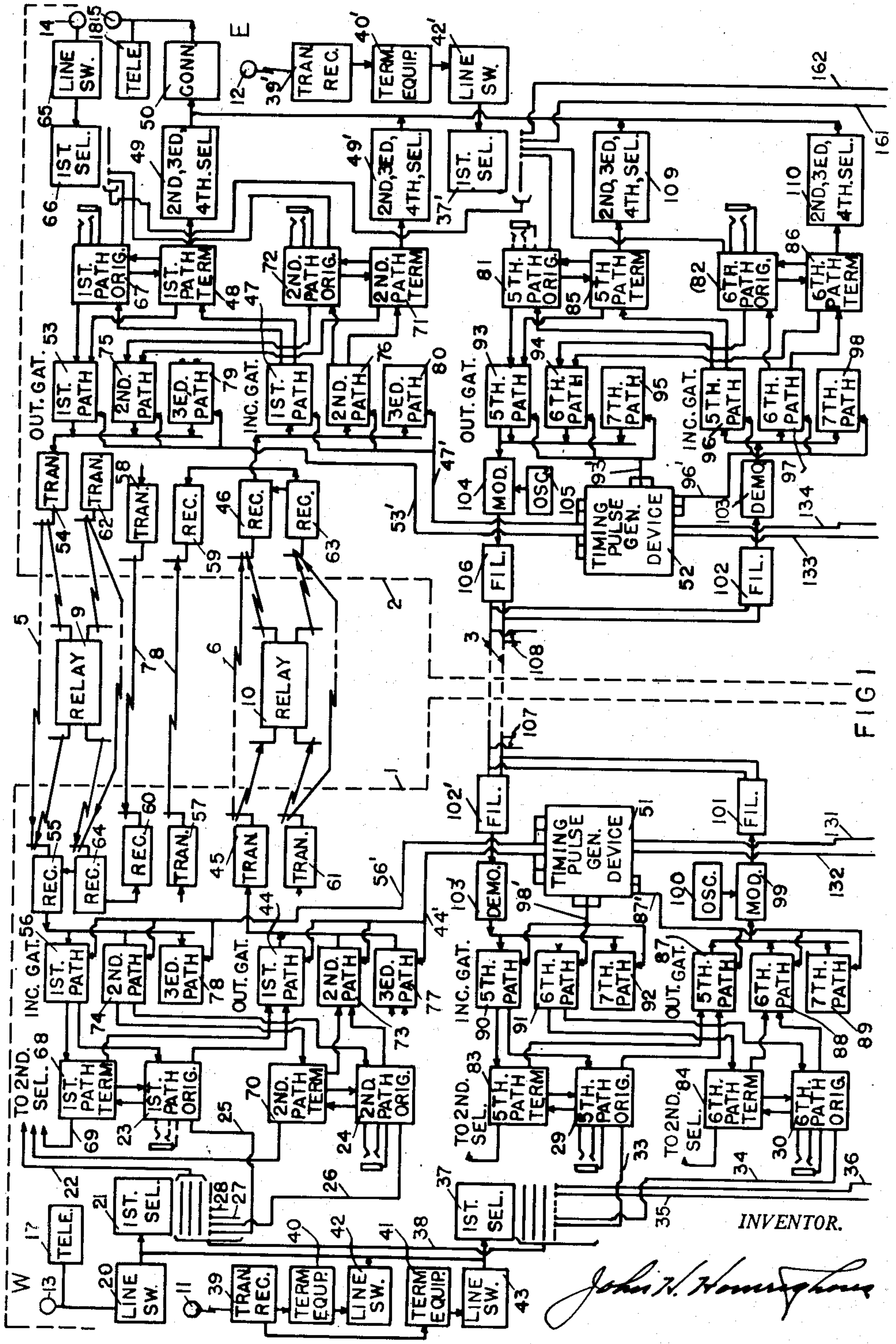
Figures 1 and 2 are diagrammatic illustrations of machines switching equipment in two telephone offices for selecting carrier wave path equipment to transmit message signals between telephone and/or radiophone subscribers in the two offices.
Figures 2, 3, 11:
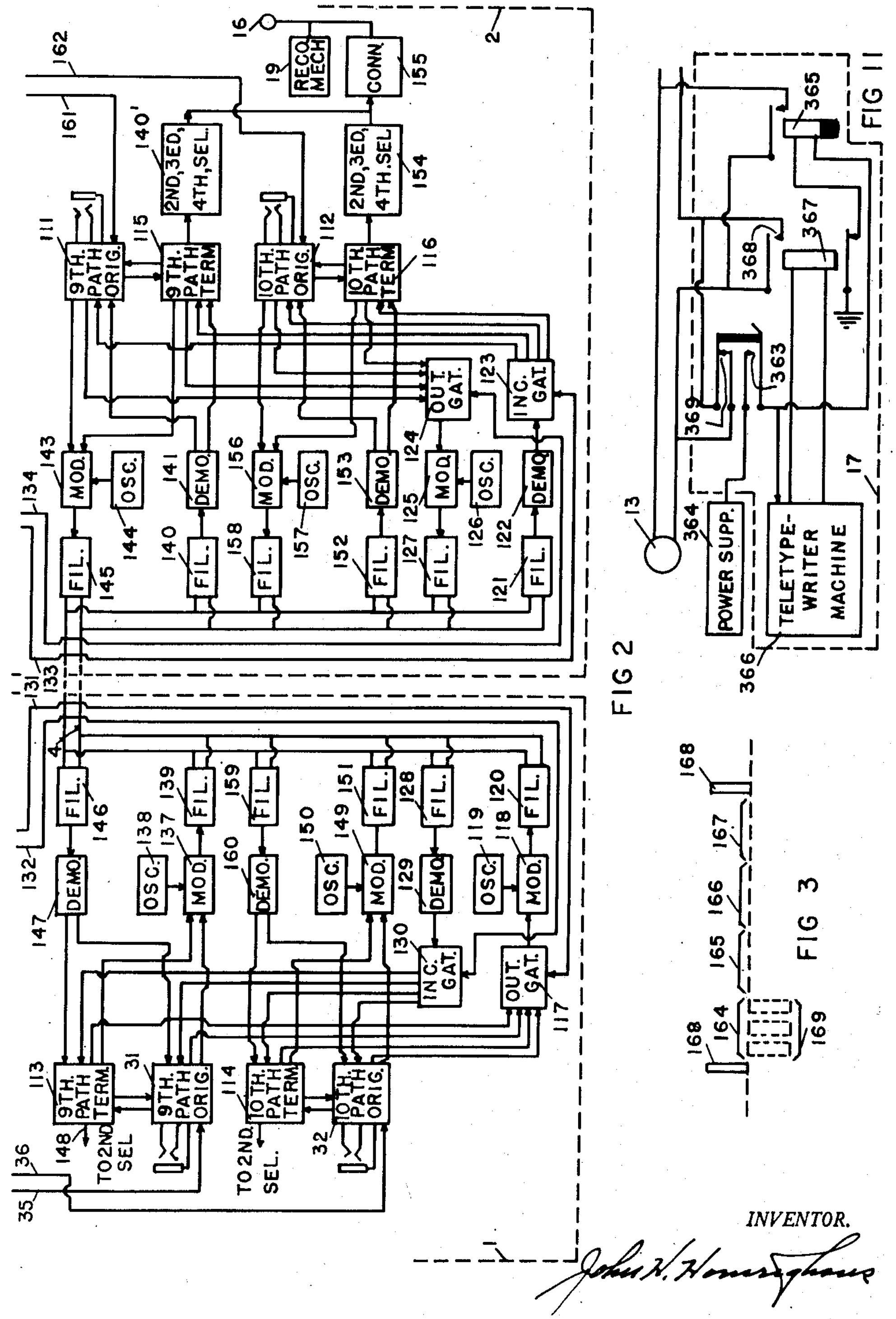
Figure 3 illustrates diagrammatically different periods of transmitting time for a plurality of messages through a common carrier wave.
Figure 11 shows a telephone station with a teletypewriter.

Referring to Figures 1 and 2, a first machine switching telephone office is shown by the reference numeral 1, and a second machine switching telephone office is shown by the reference numeral 2. A plurality of trunk lines such as 3 and 4 may be utilized for interconnecting the subscribers' lines in the two offices. Also radio transmission or multipath radio carrier waves may be utilized for two-way communication between the subscribers in the two offices as indicated by the lines 5 through 8.

The trunk line 3 and also 4 may both be utilized for transmitting a plurality of carrier waves east and a plurality of different carrier waves west. Each carrier wave may comprise a number of communication paths with each path having several individual channels separated on a time basis; i. e. signals for different functions may be transmitted during different recurring periods of time; for instance signals representative of a message may be transmitted during a first recurring period of item, dial pulse signals may be transmitted during a second recurring period and control or supervisory signals may be transmitted during a third recurring period of time.

The radio carrier waves indicated by the lines 5 through 8 may each comprise a number of communication paths with each path having several individual channels separated on a time basis for transmitting different associated signals during successive recurring periods of time as explained above for the wire lines. Relay or booster stations 9 and 10 may be employed to reamplify the signals for greater distance.

Radiophone subscribers' stations are shown at 11 and 12. telephone subscribers' stations are shown at 13. 14, 15 and 16; teletypewriter stations are at 17 and 18 which may be interchanged with the telephone stations 13 and 15. At 19 is shown recording mechanism which may be interchanged with the telephone station equipment 16.

The telephone subscriber at station 13 upon removing his receiver from its resting position may cause the line switch 20 to select an idle first selector 21, then through manipulation of its dial, not shown, the first selector 21 may be actuated to select a local second selector over trunks 22 for extending a communication path to a desired telephone subscriber in office 1. Assuming that a subscriber in office 2 is desired, then the first selector 21 responsive to dial pulses for office 2 code may select an idle originating equipment 23 or 24 over trunks 25 or 26 for radio carrier wave paths to the second office. Should the office trunks 25, 26 and trunks 27 and 28 to other originating equipment, not shown, for radio carrier wave paths be busy, then the selector 21 may automatically select any idle originating equipment 29 through 32 for land wire carrier wave paths to the second office over one of the office trunks 33 through 36. These latter trunks are shown terminating in the bank for the first selector 37. But the trunk lines terminating in the bank of selector 37 may be connected in multiple to the trunk lines terminating in the bank for selector 21 as indicated by the line 38.

Detailed description of the step by step switches is thought to be unnecessary in this application since they are well known in the communication art and may be similar to those shown and described in chapters 1 through 4 of Automatic Telephony by Smith and Campbell, 1914 edition, and chapters 1 through 3 of Telephone Theory and practice by Miller, 1933 edition, or they may be similar to those shown in Patent 1,586,308 to Homrighous, issued May 26, 1926. While I have shown step by step machine switching equipment, it is to be understood that the novel features of this invention may be equally applicable to other machine switching systems such as "panel" and "crossbar" systems.

The radiophone system comprising station 11, radio transmitter receiver 39, and the terminal equipments 40 and 41 may be similar to the radiophone system described in my time division multiplex radiophone system, application Serial No. 13,243, filed March 5, 1948 now Patent No. 2,616,080 issued October 28, 1952. This equipment may be employed by the subscriber at station 11 to extend a communication path through one of the associated line switches 42 or 43 to an idle first selector 37. By manipulation of the dial at station 11, not shown, the first selector 37 may be actuated to the proper bank level to select an idle originating equipment which may be any one of the equipments 29 through 32, 23 or 24.

The originating equipments 23, 24 and 29 are all similar and are accessible to a subscriber or a switchboard operator for extending a communication path to a subscriber's station in the second office. Each of the originating equipments comprises a hydrid coil with suitable circuits for transmitting and receiving signals over different carrier wave channels. Assuming that the originating equipment 23 has been seized by either of the selectors 21 or 37 or through an operator's cord circuit, not shown, then dial pulses produced by intermittently opening the line through manipulation of the dial or calling device at the calling station or in the cord circuit may accordingly actuate a line or pulsing relay, not shown, in the originating equipment 23 to intermittently interrupt alternating current signals supplied to one of a number of channel or gating amplifiers at 44, whereby fragmentary portions of the pulses of alternating current signals may be transmitted through the transmitter 45 via radio carrier waves to the receiver 46 in office 2. From the receiver 46 the signals may be fed to the incoming channel or gating amplifiers at 47 where the signals may be selected and supplied to a pulsing relay, not shown, in the terminating equipment 48 for actuating the machine switching selectors 49 and a connector 50 to automatically extend a communication path to a desired subscriber station 15 in the second office. Control signals and signals representative of a message may be transmitted over the same path, but through different channels or during different recurring periods of time, as controlled by the gating amplifiers 44 and 47 which are in turn controlled by timing pulses produced at 51 and 52. Message signals from the subscriber's station 15 may be transmitted through the terminating equipment 48, gating amplifier at 53, transmitter 54, via radio carrier waves to the receiver 55, gating or time controlled amplifier at 56, through the originating equipment 23 to the calling line.

The transmitters 45 and 54 may be similar, and likewise the receivers 46 and 55 may be similar. Other similar transmitters 57 and 58 and other similar receivers 59 and 60 may be employed for additional radio carrier wave communication paths between the two offices.

To eliminate or reduce static and other interferences caused by high frequency electrical equipment I provide an additional transmitter in each office as shown at 61 and 62 to transmit a special non-modulated carrier wave. Any noise or interferring signals which amplitude modulates this carrier wave may be separated in the receivers 63 and 64 and applied to the communication receivers 46, 55, 59 and 60 in proper phase relation to eliminate similar modulations in the communication carrier waves. Where booster stations such as 9 and 10 are required for greater distance, the incoming communication modulated carrier wave is reamplified without remodulation, but first the amplitude modulation caused by static and other interference is removed by feeding to the amplifier noise signals received over the special carrier wave in proper phase to cancel similar effects in the communication carrier wave, to be described in more detail later.

In the above description a call was assumed to be initiated from a station or the operator in the first office for a station in the second office. However, a call may be initiated at station 14 or any other station in office 2 for a station in office 1 using the same communication carrier wave paths. Station 14 through the line switch 65 and first selector 66 may seize originating equipment 67, similar to 23, and in cooperation with the terminating equipment 48 may transmit message, dialing and control signals through the gating amplifiers at 53 to the transmitter 54, and receive message and control signals from the receiver 46 through the gating amplifiers at 47. The terminating equipment 68, similar to 48, may receive the dial pulses to extend the communication path over the trunk line 69 to selectors and a connector, not shown, but similar to 49 and 50. The terminating equipment 70 and 71 may be similar, and the originating equipment 72 and 24 may be similar and may be employed for a second communication path in the carrier waves indicated at 5 and 6. While only two paths for each carrier wave are shown, it is to be understood that there may be at least four different communication paths in each carrier wave.

The originating and terminating equipments 24 and 76 employ gating amplifiers at 73 and 74 which may be similar to the amplifiers 44 and 56 and operate as described for the latter amplifiers to supply and receive different signals in successive rotation to the transmitter 45 and from the receiver 55 respectively. In a similar manner the gating amplifiers at 75 and 76 may control the transmission and reception of different signals through the second path equipment in office 2. The gating amplifiers at 77 through 80 may be for third path equipments, not shown.

Channel or gating amplifiers 44, 73 and 77 may be controlled by timing pulses fed over conductors 44′. Channel amplifiers 56, 74 and 78 may be under control of timing pulses supplied over conductors 56′. Channel or time controlled amplifiers 47, 76 and 80 may be under control of timing pulses supplied over conductors 47′ and amplifiers 53, 75 and 79 may be fed timing pulses over conductors 53′.

The apparatus and associated circuits for the fifth and sixth communication paths between the two offices accessible to or for controlling machine switching mechanisms in either office comprise originating equipment 29, 30, 81 and 82, terminating equipment 83 through 86, and gating amplifiers 87 through 98 which may be like the equipment described above for the first and second communication paths. This equipment, instead of controlling radio transmitters and receivers may control the transmission and reception of carrier wave signals over land wire lines.

Signals from the gating amplifiers 87, 88 and 89 may be fed in successive rotation to the modulation amplifier 99 where they may be mixed with the high frequency carrier wave produced by the oscillator 100 and fed to the filter 101 which may suppress the carrier for side band transmission over the wire line 3. The filter 102 selects the proper carrier or side band frequency which may be demodulated at 103. The signals from the demodulator may be applied to the gating amplifiers 96, 97 and 98 for separation on a time basis as explained above. In a similar manner audio frequency signals from the gating amplifiers 93, 94 and 95 may be applied to the modulation amplifier 104 where they may be mixed with a carrier wave produced by the oscillator 105 having a different frequency than the frequency produced at 100. From the amplifier 104 the modulated signals may be fed to the filter 106 where the carrier may be suppressed for side band transmission in the opposite direction over the trunk line 3. The filter 102′ selects the proper carrier or side band frequencies which may be demodulated at 103′. The signals from the demodulator may be applied to the channel or gating amplifiers 90, 91 and 92 for separation on a time basis. While equipment for two two-way communication paths through carrier wave transmitted east and another carrier wave transmitted west over the wire trunk line 3 have been described, it is to be understood that at least four communication paths may be had through each of a number of pairs of carrier waves transmitted over the trunk line 3. Additional carrier wave apparatus and associated circuits may be connected to the trunk line at 107 and 108.

The gating amplifiers 87 through 92 may be controlled by timing pulses produced at 51 and fed over conductors 87′ and 98′. The gating amplifiers 93 through 98 may be controlled by timing pulses produced at 52 and fed over conductors 93′ and 96′.

The selectors at 109 and 110 may seize the connector 50 for extending a communication path to the station 15 or trunks from the last or fourth selector may terminate in other connectors, not shown, for establishing communication paths over different office trunks to the station 15.

Station 13 may be located in an industrial plant with a branch plant in a distant city having station 15. Working time due to distance may not coincide at the two plants, so it may be desirable to have an additional service for recording messages during non-working hours. Assuming that the distant plant is closed, then the teletypewriter 18 would be connected to the station line. The subscriber at station 13 may establish a communication path to station 18 by manipulation of his dial as explained above, and after receiving a special tone he may connect the teletypewriter or code sending device 17 to his station line for transmitting the space and mark code signals over the communication path.

The subscriber at radiophone station 12 may extend a communication path through the transmitter receiver 39′ terminal equipment 40′ to the line switch 42′ and first selector 37′ as explained for similar equipment in office 1 having like reference numbers.

Referring to Figure 2 which is a continuation of Figure 1 showing trunking facilities between the two offices, the originating equipments 31, 32, 111 and 112 may be like the originating equipment described above, and the terminating equipment 113 through 116 may be like the terminating equipment described above. In Figure 2 the ninth path equipment utilizes one carrier wave transmitted east and a second carrier wave transmitted west full-time for signals representative of a two-way communication transmitted over trunk line 4, whereas two carrier waves on trunk line 3 may have at least four different communication paths on a time division basis. Likewise the tenth path equipment utilizes two carrier waves full-time for a two-way communication transmitted over trunk line 4. However, the dialing signals and control signals for each path may be transmitted through separate pilot carrier waves in both directions over the wire trunk line 4.

Dialing signals and supervisory or control signals for the ninth path office 1 may be transmitted through a pair of gating amplifiers at 117. Similar signals for the tenth path may be transmitted through a second pair of gating amplifiers at 117. The gating amplifiers at 117 may be similar to the amplifiers at 44 except that there would only be two per path instead of three as at 44, since the message signals are transmitted full-time over an individual carrier wave as brought out above. Fragmentary portions of the dialing and control signals from the amplifiers 117 may be fed in successive rotation to the modulation amplifier 118 where they may be mixed with a carrier wave produced in the oscillator 119 and supplied to the filter 120 to be transmitted over the trunk line 4. In office 2 the carrier wave or side band frequencies may be selected by the filter 121, demodulated at 122 and fed to the gating amplifiers 123. A pair of amplifiers, one for dialing signals and a second for control signals, may be furnished at 123 for each communication path. The gating amplifiers 123 may be like 47 except that there would be one less amplifier per path because voice signals are transmitted over an individual carrier wave. Dial signals from the amplifiers 123 may be fed to the equipments 115 and 116 to actuate pulsing relays, not shown, to in turn actuate machine switching selectors and connectors such as 154 and 155. Dial and control signals for the ninth and tenth path in office 2 may be transmitted through the gating amplifiers 124, similar to the amplifiers 117, and fed to the modulation amplifier 125 where they are modulated on a carrier produced in the oscillator 126 and supplied to the filter 127 for transmission over the trunk line 4. These signals may be selected by the filter 128, demodulated at 129 and fed to the gating amplifiers 130, similar to 123, for separation on a time basis. Dial signals from the amplifiers 130 may be fed to the equipments 113 and 114 to actuate pulsing relays, not shown, to in turn actuate machine switching selectors and connectors in office 1. The gating amplifiers 117 and 130 may be controlled by timing pulses received over conductors 131 and 132 from the device 51, and the gating amplifiers 123 and 124 may be controlled by timing pulses received over conductors 133 and 134 from the device 52.

The originating equipment 31 and 32 may be accessible to subscribers over office trunks 35 and 36 from the first selector 37. Message signals through the ninth path equipment 31 may be fed to the modulation amplifier 137, modulated on a carrier produced by the oscillator 138 and supplied to the filter 139 for transmission over the trunk line 4. In office 2 the particular carrier or side band frequencies may be selected by the filter 140, demodulated at 141 and fed to the terminating equipment 115 for transmission through the office trunks, interconnected by the selectors 140′ to a called station. The return message signals or message signals for calls originating in office 2 may be fed to the modulation amplifier 143, modulated on a carrier produced by the oscillator 144 and fed to the filter 145 for transmission over the trunk line 4 to office 1 where the particular carrier wave or side band frequencies may be selected by the filter 146, demodulated at 147 and supplied to the equipment 31 for transmission to a calling station. Assuming that the call originated in office 2, then the message signals would be transferred to the terminating equipment 113 for transmission over office trunks, one shown at 148, interconnected by selectors, not shown, but controlled by dialing pulses received through the gating amplifiers 130.

Message signals through the tenth path equipment 32 may be fed to the modulator 149 mixed with a carrier wave produced by the oscillator 150 and fed to the filter 151 for transmission to office 2. In office 2 the carrier or side band frequencies may be selected by the filter 152, demodulated at 153 and fed to the equipment 116 for transmission to a called subscriber station 16 through office trunks interconnected by selectors 154 and the connector 155. Message signals transmitted in the opposite direction may be fed to the modulation amplifier 156, mixed with a carrier wave produced by the oscillator 157 and fed to the filter 158 for transmission over trunk line 4 to office 1. The side band frequencies may be selected at the filter 159, demodulated at 160 and supplied to the equipment 32 for transmission to a calling station. Had the call originated in office 2, then the message signals would be transferred to the terminating equipment 114 for transmission to a called line. In office 2 the originating equipment 111 and 112 may be accessible from the first selector 37′ over trunks 161 and 162.

Recording station 19 may be substituted for the subscriber's station 16 when it is desired to record incoming messages in the absence of an attendant.

A non-modulated carrier wave may be transmitted east and another non-modulated carrier wave may be transmitted west over either trunk line 3 or 4 in order to make corrections for noise, including cross modulation from other open wire lines or cable pairs as described above in connection with the radio transmitter 61, 62 and receivers 63 and 64. Furthermore one or more repeater or relay stations may be utilized in the wire trunk line between the two offices similar to the booster stations 9 and 10.

From the above description it has been shown that each of the first selectors 21 and 37 may have access through a single level of bank contacts, the bank contacts for one switch being connected to similar contacts for the other switch, to multi paths through a radio carrier wave, or multi paths through carrier waves transmitted over land wire trunk lines, where each path may be utilized to transmit message, dial and supervisory signals. Also from the above mentioned level of bank contacts, in each switch individual carrier waves may be accessible for transmitting message signals over land wire trunk lines with a pilot carrier wave for transmitting only the dialing and supervisory signals.

Similar carrier wave equipment is provided in office 2 which may be accessible to first selectors in the latter office for automatically establishing communication paths to land wire and radio station subscribers in office 1.

Figure 3 shows diagrammatically periods of time for transmitting a plurality of messages through a space radiated carrier wave or through a carrier wave transmitted over a land wire line. Each one-way communication path may comprise three different periods, a first period for signals representative of a message, a second period for dialing pulse signals and a third period for supervisory signals as illustrated at 164 for the first path, 165 for the second path and 166 and 167 for the third and fourth paths. There are twelve different periods in which timing pulses may be produced to control transmission of signals through the different communication paths. In the thirteenth period of each series of recurring periods, a synchronizing signal, illustrated at 168, may be produced in office 1 and transmitted to office 2 and other telephone offices in the area to synchronize the timing pulse generating device in office 2 with the timing pulse generating device in office 1.

The synchronizing pulses may be retransmitted in each relay or booster station to the distant telephone office to control at the distant office the periods of time for signal transmission in both directions. That is, periods one to twelve in the carrier waves transmitted east may coincide at each station with periods one through twelve in the carrier waves transmitted west, as illustrated by the periods 164 for one carrier wave and 169 for a carrier wave transmitted in opposite direction. Therefore all offices in the system may be controlled from a central point so that signals from a called station, regardless of distance, may be transmitted from the called station and relay stations during periods controlled by synchronizing signals produced at a single or master office.

Figure 4:
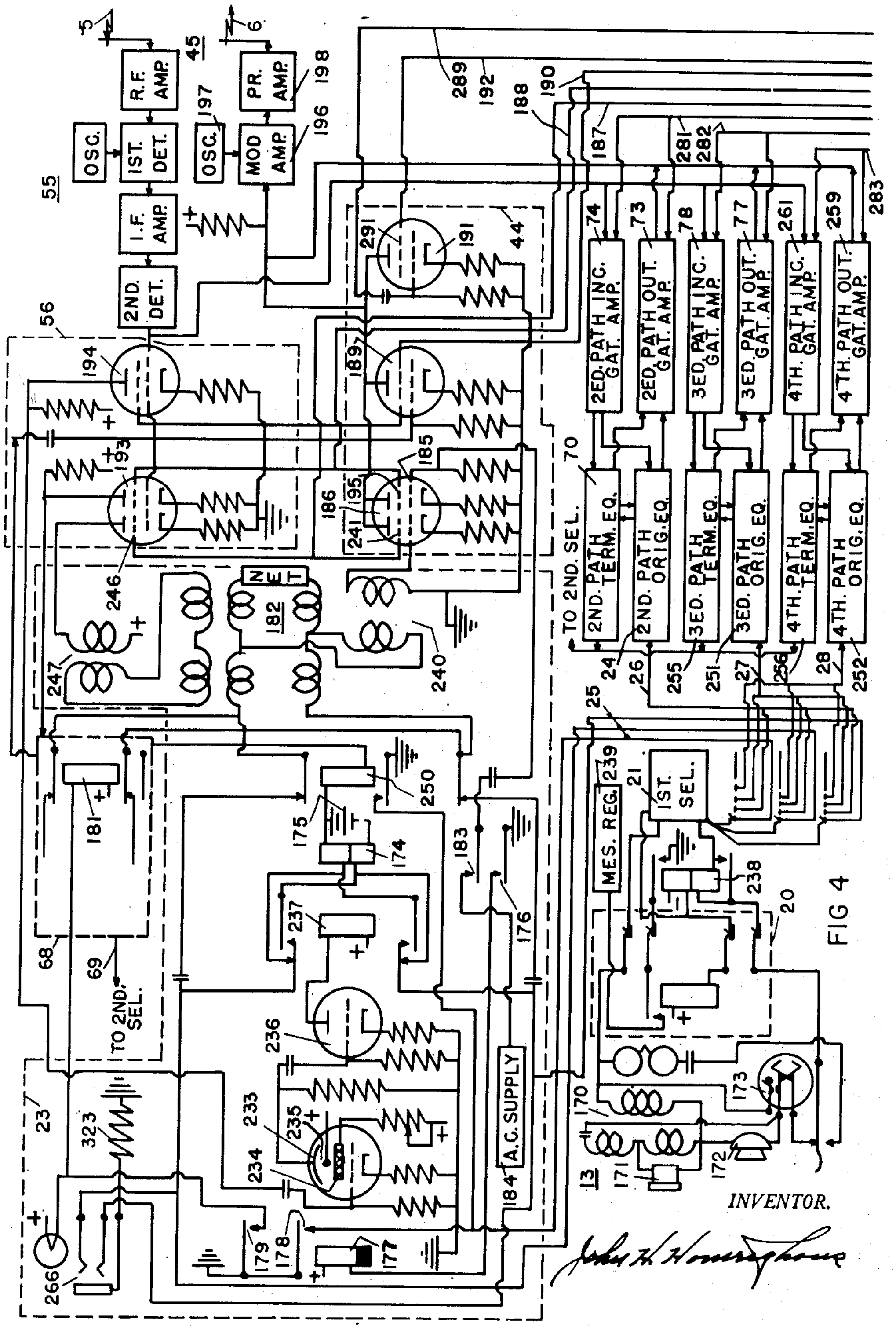
Figures 4 and 5 are diagrammatic illustrations of a plurality of originating and terminating carrier wave path equipments and circuits, with incoming and outgoing channel amplifiers, for radio transmission of message and control signals.

Figure 4 with Figure 5 to the right, and Figures 6 and 7 below Figures 4 and 5 respectively, show multi path terminal equipment and associated circuits for two-way radio transmission between office 1 and office 2, whereby a subscriber at any telephone or radiophone station served in a first office may automatically extend a communication path to any telephone or radiophone station served in a second office.

The telephone station 13 may be of any well known conventional type, and comprises a three winding transformer 170, a receiver 171, microphone 172 and a dial 173. The station may be connected by a wire line to a rotary line switch 20 at office 1. It is to be understood that a line finder may be substituted for the line switch. Upon removing the receiver from the switch hook, the line switch may automatically rotate to seize an idle first selector 21. Rotating the dial 173 for the first digit or code letter in the number for a desired station may cause the selector to move its brushes vertically step by step to a certain level of bank contacts according to the digit dialed, after which the selector brushes will automatically rotate to a first idle trunk, which is assumed in this case to be office trunk 25 extending to the originating equipment 23. Line or pulsing relay 174 will now be energized from battery 175 over the positive and negative line conductors extending through trunk 25 and the telephone line to the station 13. Relay 174 upon energizing closes a circuit at springs 176 to slow-to-release relay 177. Relay 177 upon energizing connects ground potential at springs 178 to the private conductor in trunk 25 so that trunk 25 will now test busy to other first selectors. Relay 177 also closes a circuit at springs 179 through lamp 180 to battery, to inform an operator that equipment 48 is busy, and through relay 181 to battery. Relay 181 upon energizing disconnects the terminating equipment 68 from the hybrid coil 182.

The energization of line relay 174 closes a circuit at springs 183 from a source of alternating current 184 to the control grid 185 in the gating amplifier tube 186. The first path outgoing gating amplifiers 44 may comprise a multi unit gating amplifier 186 under control of first and second period timing pulses received over conductors 187 and 188 from the pulse generating device of Figure 6, gating amplifier 189 under control of third period timing pulses received over conductor 190, and in only the first path of outgoing gating amplifiers a third gating amplifier 191 may be controlled by the thirteenth period timing pulse produced in the device of Figure 6 and received over conductor 192 for controlling synchronizing signal transmission. The first, second and third period timing pulses also control the first path incoming gating amplifiers 56 comprising the multi unit tube 193 and a second tube 194. The left unit and the right unit in each of the tubes 186 and 194 may be considered as separate gate amplifiers.

Second period timing pulses applied to the gating grid 195 may render the right unit of tube 186 intermittently conductive to supply fragmentary portions of alternating current signals, fed to the control grid 185, to the modulation amplifier 196 of the transmitter 45. The alternative current control signals may be modulated on a carrier wave produced by the oscillator 197 and fed to the power amplifier 198 for space or wireless transmission to the radio frequency amplifier 198 of receiver 46 in office 2. The carrier wave from the amplifier 198 may be fed to the first detector stage 199 where an oscillator 200 may react with the carrier wave to produce an intermediate frequency which is fed to the amplifier 201. From stage 201 the intermediate frequency may be demodulated in the second detector stage 202 and the fragmentary portions of the alternating current signals may be fed to the control grids in the first path incoming gating amplifiers 47 comprising a multi unit gating amplifier 203 under control of first and second period timing pulses received over conductors 204 and 205 from the pulse generating device in Figure 7, a second gating amplifier 206 under control of third period timing pulses received over conductor 207 and in only the first path of incoming gating amplifier a third amplifier tube 208 may be provided to receive synchronizing signals but not under control of timing pulses. The first, second and third period timing pulses also control the first path outgoing amplifiers 53 comprising the multi unit tube 209 and a second tube 210.

Figure 7:
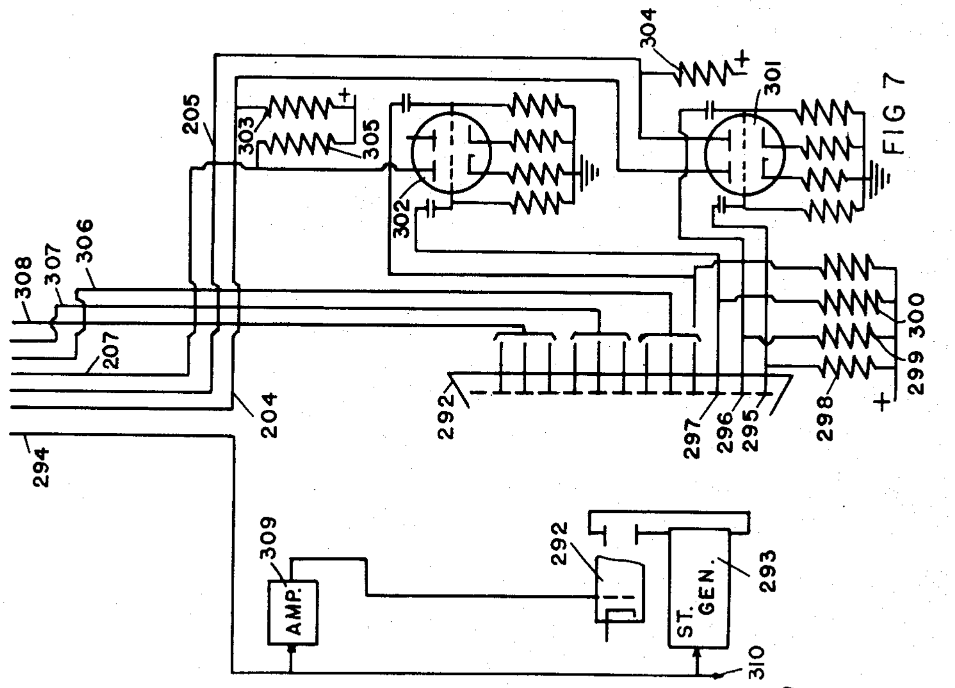
Figures 6 and 7 are electronic timing pulse generating devices for the terminal equipments in Figures 4 and 5.
Figure 6:
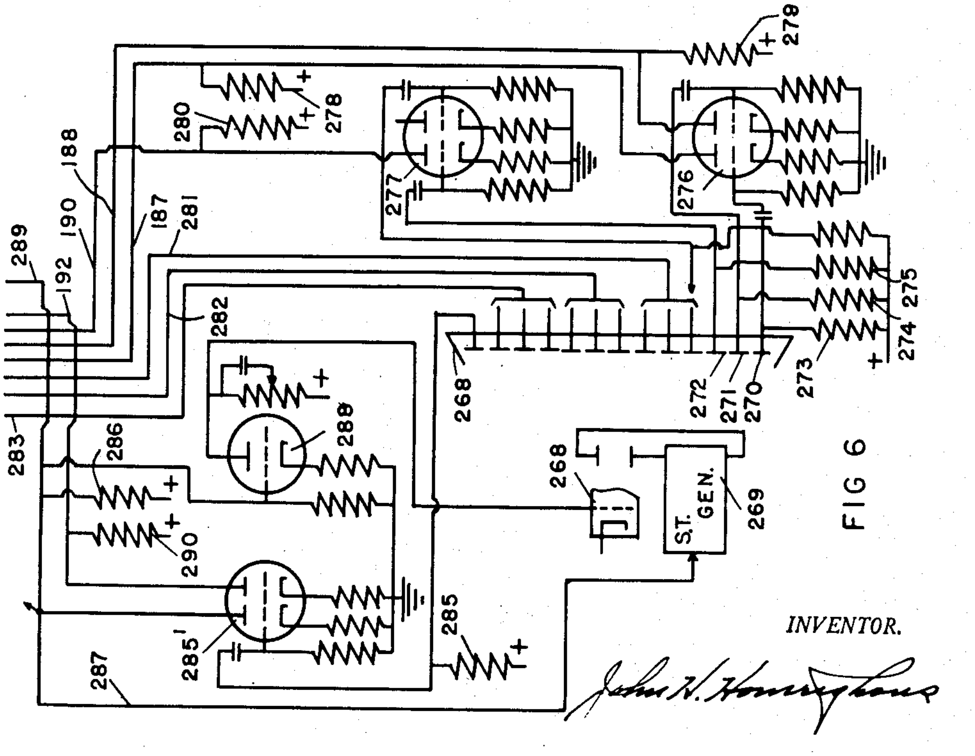

Second period timing pulses from pulse generating device Figure 7 applied to the gating grid 211, in synchronism with the second period timing pulses produced in the pulse generating device Figure 6, may render the right unit of tube 203 conducted to the fragmentary potrions or samples of alternating current signals supplied to the control grid 212. These alternating current signals after suitable amplification in the right unit of tube 203 may be applied to the grid 213 in the electrical device or slow acting tube 214, causing the anode 215 to glow.

The slow acting tube 214 and all other similar tubes in this application may be like the tube described in my Patent No. 2,425,877, issued August 19, 1947. Briefly this tube may comprise a triode having a luminescent coated anode of relative slow decay so that the anode is caused to glow from suitable voltages fed to its control grid. Due to the decay time of the luminescent material the anode will continue to glow during a relatively high rate of intermittent voltages applied to its control grid to in turn cause current flow through its adjacent photoelectric cell.

Glow from the anode 215 may cause current flow through the photo cell 216 to increase the potential on the control grid in tube 217 rendering this latter tube conductive to in turn energize pulsing relay 218. Relay 218 upon energizing closes a circuit at make contact 219 through slow-to-release relay 220. Relay 220 upon energizing closes a circuit at springs 221 through relay 222 to in turn disconnect the originating equipment 67 from the hybrid coil 223 and to ground the private 224 so that the first path equipment will test busy to first selectors in office 2. The pulsing relay 218 at springs 225 completes a circuit through the hybrid coil 223, one winding of supervisory control relay 226, line conductors 227 and 228 to a line or pulsing relay, not shown, in the second selector. The magnetic flux produced by the winding of relay 225 included in the line circuit is opposed by the magnetic flux produced in the holding winding the circuit of which was completed at springs 221. The armature of relay 226 will not be actuated by current through either winding alone, but only when the two fields are aiding will the armature be actuated.

A modification of the dialing or control circuit for the pulsing relay 218 may utilize a time constant circuit comprising a resistor and condenser in conventional manner, not shown, instead of the slow acting tube 214. The values of resistance and capacitance being such that the time constant is long compared with the time division channel repetition interval.

The subscriber at station 13 rotating his dial for the remaining digits in the number of a desired station will cause the line or pulsing relay 174 Figure 4 to interrupt the alternating current supplied to the transmitter 45, thereby interrupting the current through photo cell 216 to in turn cause pulsing relay 218 to be intermittently actuated in accordance with the digits dialed. The anode 215 in tube 214 maintains its brilliancy substantially constant during the relatively high frequency of channel interruptions of alternating current, but interrupting current through the photo cell 216 responsive to dial interruptions of the alternating current. Relay 218 responsive to dial pulses may interrupt the line circuit at springs 225 extending over conductors 227 and 228 to the selectors 49 and the connector 50 to extend a communication path through office trunks and a subscriber's line to station 15. Relay 220 remains operated during pulsing of relay 218 and a circuit for relay 229 is completed through its contacts and the brake contact 230 of relay 218. Relay 229 will therefore be energized during pulsing of relay 218 to shunt the hybrid coil and relay 216 for each digit dialed.

The connector 50 will test the called line for busy condition, and if busy, a busy tone will be transmitted to the calling subscriber over the talking channel to be described in more detail later. Should the called line be idle, ringing current will be transmitted to the called line from the circuits of connector 50 and ringing tone may be transmitted to the calling station. Refer to my above mentioned patent, No. 1,586,308 for detail operation of the selectors and connectors.

The subscriber at station 15, having station equipment which is like the equipment described for station 13, may remove his receiver from the switch hook in response to ringing of telephone bell, thereby closing the line circuit through a relay in the connector, not shown here, to reverse the direction of current over office trunks including the conductors 227 and 228. Relay 226 will now be actuated, since both windings will be aiding magnetization, to close a circuit at springs 231 from a source of alternating current at 232 to the control grid in the gating amplifier 210. The tube 210 may be under control of third period timing pulses received over conductor 207 to supply fragmentary portions of alternating current signals to the transmitter 54 for wireless transmission to the receiver 55 Figure 4. Since the transmitter 54 is similar to the transmitter 45, and the receiver 55 is similar to the receiver 46, detailed description of the transmitter 54 and the receiver 55 is thought to be unnecessary.

The fragmentary portions of alternating current supervisory or control signals after demodulation in the receiver 55 may be fed to the control grid of gating amplifier 194, which is under control of third period timing pulses received over conductor 190, and after suitable amplification in tube 194 the signals may be applied to the control grid in slow acting tube 233 causing the anode 234 to glow to in turn cause current flow through the photo-electric cell 235. Current through cell 235 may render tube 236 conductive to in turn energize relay 247. Relay 237 upon energizing reverses the direction of current in line conductors of office trunk 25 and through the subscriber's line to the calling station 13. Reversing the direction of current over the calling line causes the differential relay 238 to be actuated, to in turn operate the message register 239 of conventional type for measured service. Relay 238 may be similar to relay 226 and will only operate when both windings are aiding magnetization.

From the above description it has been shown that dial pulse signals may be transmitted east through one of the time division channels in a multi channel carrier wave path and supervisory signals may be transmitted west through another time division channel in a different multi channel carrier wave path.

Communication signals from the calling station may be supplied through a conventional hybrid coil 182 and transformer 240 to the control grid in the left unit of gating amplifier 186. First period timing pulses from conductor 187 applied to the gating grid 241 may render the left unit of tube 186 intermittently conductive to supply fragmentary portions of the communication signals fed to the control grid to the transmitter 45 where they may be modulated on the same carrier wave with the dial pulse signals but separated on a time division basis.

In the receiver 46 these communication signals may be separated from the carrier wave or side band frequencies and applied to the control grid in the left unit of tube 203, which unit may be under control of first period timing pulses from conductor 204 supplied to the gating grid 242 to render the left unit of tube 203 conductive to the fragmentary portions of communication signals fed to its control grid. The communication signals, after suitable amplification in the left unit of tube 203, may be fed through transformer 243, hybrid coil 223 and office trunks interconnected by the switches 49 and 50 including conductors 227 and 228 to the called subscriber's line and station 15.

Communication signals from the called station 15 may be supplied through the same office trunks interconnected by the switches 49 and 50, hybrid coil 223, transformer 244, to the control grid in the left unit of the gating amplifier 209. First period timing pulses from conductor 204 applied to the gating grid 245 may render the left unit of tube 209 intermittently conductive to supply fragmentary portions of the communication signals, fed to the control grid, to the transmitter 54 where they are modulated on the same carrier wave with the supervisory signals but separated on a time division basis.

In the receiver 55 after demodulation, these communication signals may be applied to the control grid in the left unit of gating amplifier 193 which is under control of first period timing pulses from conductor 187 supplied to the gating grid 246 to render the left unit of tube 193 conductive to the fragmentary portions of communication signals fed to its control grid. The communication signals after suitable amplification in the left unit of tube 193 may be fed through transformer 247, hybrid coil 182 and the line conductors of office trunk 25 to the calling line and station 13.

Suppose that a subscriber in office 2 is calling another subscriber in office 1; then the originating equipment 67, like originating equipment 23, may be seized by a first selector, not shown, whereby, the relay 248 may be energized to disconnect the terminating equipment 48 from the hybrid coil 223, and dial pulse signals of alternating current may be applied over conductor 249 to the control grid in the right unit of tube 209 which is under control of second period timing pulses received over conductor 205. The method of operation is the same as described in connection with the originating equipment 23.

In office 1 the dial pulse signals received from the receiver 55 may be selected and amplified in the right unit of gating amplifier 193 which is under control of second period timing pulses received over the conductor 187. From the right unit of tube 193 the signals may be fed to the terminating equipment 68, whereby relay 250 may be energized to disconnect the originating equipment 23 from the hybrid coil 182, and the dial pulse signals may actuate a train of switches, not shown, but similar to 49 and 50, to extend a communication path to a called station in office 1. The method of operation is the same as described for the terminating equipment 48.

Supervisory signals produced in response to the called subscriber's removing his receiver from the switch hook may be applied to the control grid in gating amplifier 189 which is under control of third period timing pulses received over conductor 190 to render it conductive during recurring periods of time to cause supervisory signal transmission to office 2. In office 2 these supervisory signals may be received at 47 and applied to the control grid in gating amplifier 206 which is under control of third period timing pulses received over conductor 207. These supervisory signals may control a message register, not shown, similar to 239 for measured service. The method of operation in both offices is the same as described above for a call originating in office 1.

Communication signals, including ringing and busy tone signals, between the two stations may be transmitted in a manner similar to that described above for stations 13 and 15.

From the above description it has been shown that a communication path may be automatically extended from a calling line through machine switching equipment and carrier wave terminal equipment over one of a number of paths in a multi channel per path carrier wave to a called line, wherein one channel may be for dial pulse signals and a second channel may be for signals representative of a message.

Figure 5:
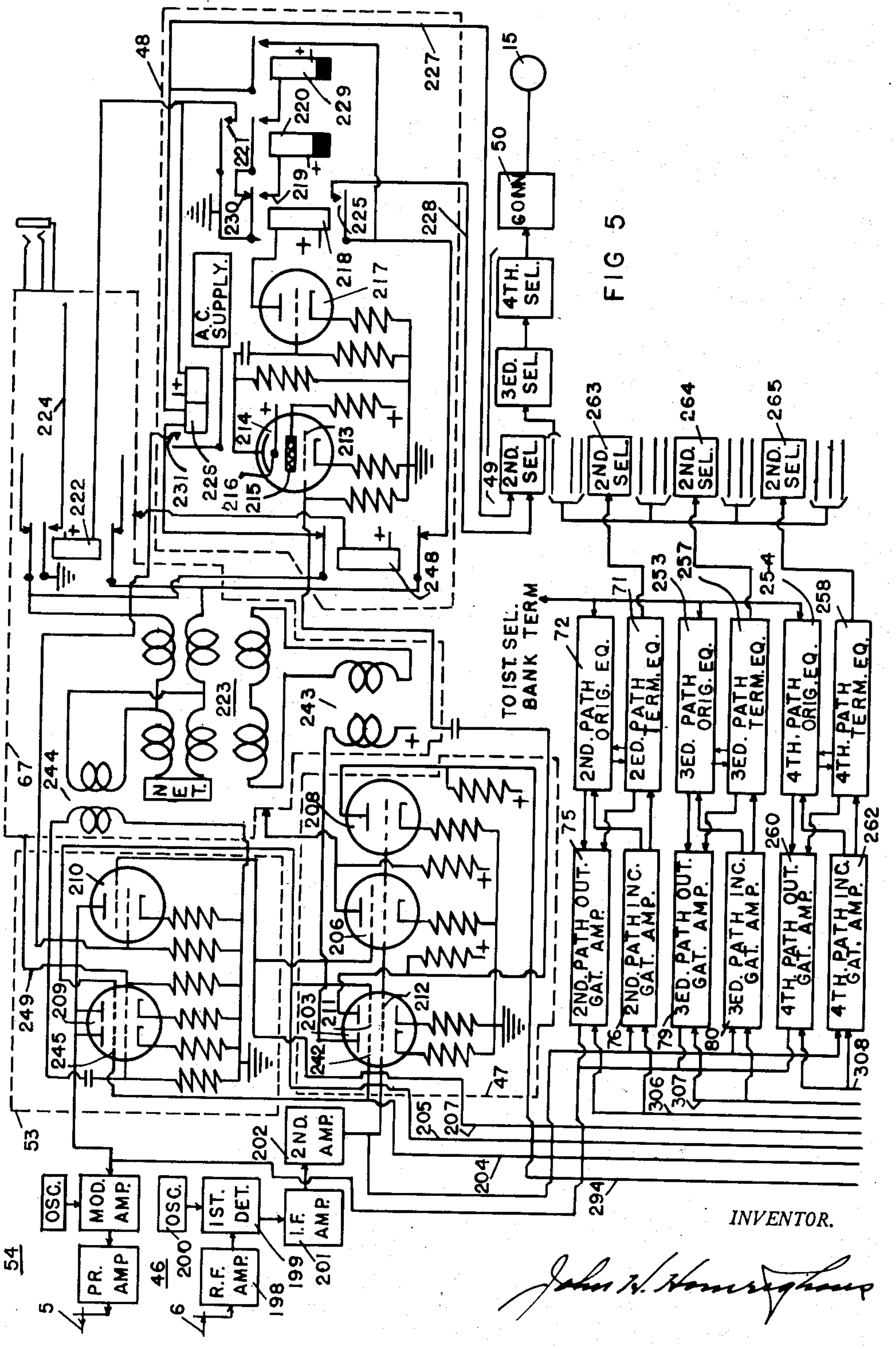

In Figures 4 and 5 there are shown originating and terminating equipments with associated channel or gating amplifiers, in block form for the second, third and fourth paths in addition to the first path equipment shown in detail for a common carrier wave. Since originating equipments 24, 72, 251 through 254 may be similar to 23, terminating equipment 70, 71, 255 through 258 may be similar to 48, outgoing gating amplifiers 73, 75, 77, 79, 259 and 260 may be similar to the gating amplifier 53, and incoming gating amplifiers 74, 76, 78, 80 and 261 and 262 may be similar to 56, further description is not thought to be necessary. Selectors 263, 264 and 265 may be similar to any one of the selectors 49, and since office trunks terminating in their multiple banks are common or connected in multiple they may have access to the same third selectors for extending communication paths to the same stations.

A switchboard jack similar to the jack 266 may be connected to each of the originating equipments so that an operator through a connected cord circuit may use the same terminal facilities as a subscriber for extending communication paths to a second office, to be explained in more detail later.

Relay 174 Figure 4 and relay 218 Figure 5 may be considered impulse repeaters in that they repeat the impulses by opening and closing a circuit through a local source of power.

With reference to Figure 6 showing a device for producing channel recurring timing pulses, which device comprises a cathode ray tube 268, of conventional type except that it may be provided with thirteen plates or anodes arranged in a row near one end of the tube, and an electron ray directed toward the anodes. The electron ray may be deflected across the anodes by saw tooth waves produced in the saw tooth generator 269. This cathode ray tube and associated saw tooth generator may be similar to those described in my application Serial No. 13,243.

As an electron ray impinges the anodes 270, 271 and 272, current flows through the load resistors 273, 274 and 275 to produce a voltage drop on the control grids in the double unit tubes 276 and 277. The voltage drop on the control grid in the left unit of tube 276 may produce an increase in potential at load resistor 278 for the first period timing pulse supplied over conductor 187 to the circuits of Figure 4. The drop in potential on the control grid in the right unit of tube 276 may produce an increase in potential at load resistor 279 for the second period timing pulse supplied over conductor 188 to Figure 4. The voltage drop on the control grid in the left unit of tube 277 may produce an increase in potential at load resistor 280 for the third period timing pulse which is supplied over conductor 190 to Figure 4. The first, second and third period timing pulses control signal transmission and reception for the first communication path in Figure 4, and in a similar manner each set of three anodes produces timing pulses which may be supplied over conductors 281, 282 and 283 to the gating or channel amplifiers Figure 4 to control signal transmission and reception for the second, third and fourth communication paths.

The electron ray impinging the thirteenth anode 284 causes a voltage drop at resistor 285 which is applied to the control grids in double unit tube 285'. The voltage drop on the control grid in the left unit of tube 285 may produce an increase in potential at resistor 286 which may be applied over conductor 287 for triggering the saw tooth generator 269, causing the electron ray to be deflected backwards each time it impinges anode 284. The potential change at resistor 286 may be applied to the control grid of tube 288 to produce a negative potential on the control grid in the cathode ray tube 268 to blank the electron ray during retrace. The increase in potential at resistor 286 may also be applied over conductor 289 to the control grid in gating amplifier 191 Figure 4, which is under control of timing pulses produced at load resistor 290, for the right unit of tube 288 and supplied over conductor 192 to the gating grid 291 in tube 191, whereby synchronizing signals may be transmitted during the intervals for the thirteenth period timing pulses for synchronizing timing pulse generating devices in office 2.

While I have shown a cathode ray tube device for producing timing pulses, it is to be understood that this device may be any mechanical commutator arrangement for producing a series of successive pulses.

In Figure 7 there is shown another device for producing channel recurring timing pulses in office 2 under control of synchronizing signals received from office 1. This device may be similar to the timing pulse generating device of Figure 6 and may comprise a cathode ray tube 292 provided with thirteen anodes arranged in a row near one end of the tube and an electron ray directed toward the anodes. The electron ray may be deflected by saw tooth waves produced in the saw tooth generator 293 under control of synchronizing signals received over conductor 294.

As the electron ray impinges the anodes 295, 296 and 297, current flows through the load or dropping resistors 298, 299 and 300 to produce a voltage drop on the control grids in the double unit tubes 301 and 302. The voltage drop on the control grid in the left unit of tube 301 may produce an increase of potential at resistor 303 for the first period timing pulse supplied over conductor 204 to the circuits of Figure 5. The drop in potential applied to the control grid in the right unit of tube 301 may produce an increase in potential at load resistor 304 for the second period timing pulse supplied over conductor 205 to Figure 5. The voltage drop on the control grid in the left unit of tube 302 may produce an increase in potential at load resistor 305 for the third period timing pulse which is supplied over conductor 207 to Figure 4. The first, second and third period timing pulses control signal transmission and reception for the first communication path in Figure 5, and in a similar manner each set of three anodes produces timing pulses, which may be supplied over conductors 306, 307 and 308 to the gating or channel amplifiers in Figure 5 to control signal transmission and reception for the second, third and fourth communication paths.

The thirteenth anode in tube 292 is not used because the saw tooth generator 293 may be triggered by synchronizing signals received through the thirteenth channel at channel amplifier 208 Figure 5 and applied over conductor 294 to the saw tooth generator 293. These same signals may be fed to the amplifier 309 for blanking cathode ray tube 293 during the backward deflection of the electron ray. Timing pulses are not utilized in channel amplifier 208 so that the saw tooth generator 293 may be triggered upon reception of the first synchronizing signals from office 1. The signals received over conductor 294 may be supplied to other generators in the same office over conductor 310, and the synchronizing signals produced in the circuits of Figure 6 may be fed to other generators in office 1.

Figure 8:
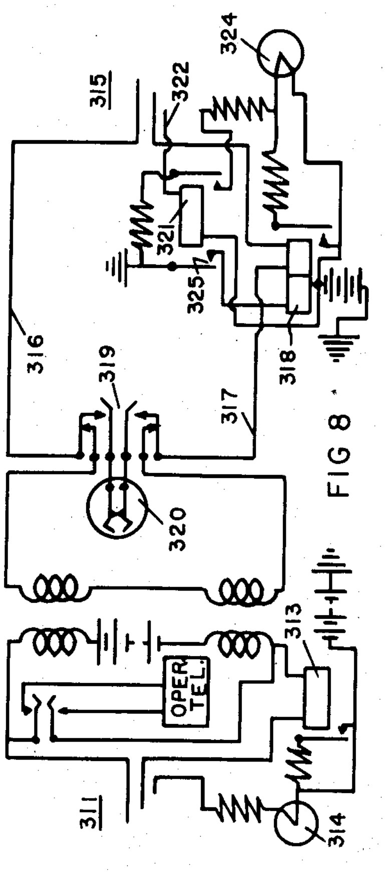
Figure 8 shows a cord circuit.

A local or toll operator may connect a calling line through the cord circuit of Figure 8 to the jack 266 Figure 4 to extend a communication path to any station in the distant office 2. The answering plug 311 may be connected to a calling subscriber's line jack, not shown, whereby battery through windings of the transformer 312 and relay 313 may be fed to the calling line. Relay 313 will be energized over the line circuit, but deenergized when the line is opened by the calling subscriber replacing his receiver to light the lamp 314 for informing the operator to remove the plug 311.

Inserting plug 315 into jack 266 Figure 4 completes a circuit from battery through pulsing relay 174, conductors 316 and 317, line winding of relay 318 and windings of transformer 312. By operation of key 319 the dial 320 is connected in series with the line, whereby the operator, through manipulation of the dial in accordance with the number of a desired station, may cause the pulsing relay 174 to transmit dial pulse signals over an outgoing channel for actuating the selectors 49 and connector 50 in office 2 to extend a communication path to station 15 as previously explained.

The calling and called subscribers may communicate over separate message signals channels between the two offices as explained above.

Inserting the plug 315 into jack 266 completes a circuit from battery through relay 321, sleeve conductor 322, resistor 323 to ground potential. Relay 321 upon energizing closes a circuit through supervisory lamp 324, and at contacts 325 closes a circuit for a second winding of the differential relay 318. Relay 318 is connected so that the magnetic flux for the two windings oppose each other until such time that the called subscriber at station 15 removes his receiver from the switch hook to in turn transmit supervisory signals over a separate channel to actuate relay 237 Figure 4, as previously explained. Relay 237 upon energizing reverses the direction of current over conductors 316 and 317 and through the line winding of relay 318, in which case both windings will be aiding and the relay will be actuated to extinguish the lamp 324. However as soon as the subscriber at station 15 hangs up his receiver, relay 237 will be restored to its normal position to reverse the direction of current through line winding of relay 318, restoring it to its normal position to cause lamp 324 to glow, informing the operator that the called subscriber has terminated his conversation.

From the above description it has been shown that an operator may automatically select a two-way communication path to a subscriber in a distant office comprising a first channel for dial pulse signals, a second channel for message signals, and a third channel for supervisory signals whereby the operator may be informed that the called subscriber has hung up his receiver. It is to be understood that similar equipments for the second, third and fourth paths in office 1 and similar equipment for the different paths in office 2 may be likewise employed by an operator to extend a communication path to a distant office.

While I have shown and described terminal equipment associated with space transmitters and receivers, it is to be understood that the transmitters 45 and 54, Figures 4 and 5, may be replaced by any of the equipments for wire line transmission of carrier waves shown in Figures 1 and 2 for the fifth, sixth, ninth and tenth paths, such as the equipment 99, 100 and 101', and 125, 126 and 127. Likewise the receivers 46 and 55, Figures 4 and 5, may be replaced by any of the equipments for wire line reception of carrier waves shown in Figures 1 and 2, such as the equipment 102 and 103, and 146 and 147.

Figure 9:
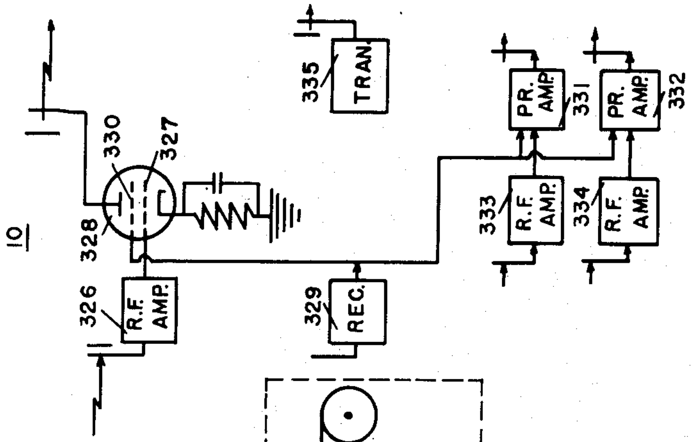
Figure 9 shows relay station apparatus and associated circuits.

Referring to Figure 9 showing in more detail the relay or booster station 10 in Figure 1, the modulated carrier or side band frequencies from the transmitter 45 Figure 4 may be received in the radio frequency amplifier 326 and fed to the control grid 327 in the power amplifier 328. The numeral 329 represents a receiver which may be similar to the receiver 46 Figure 5 but tuned to receive a special carrier wave from the transmitter 61 Figure 1, which carrier wave is not modulated at the transmitter but may pick up noise signals caused by static or electrical equipment, which tends to amplitude modulate this special carrier wave and all other carrier waves that are modulated with message signals and transmitted from office 1. In the receiver 329 the noise signals may be separated by demodulation and fed in reverse phase relation to a second grid 330 in stage 328 to eliminate similar amplitude modulations from the message signal modulated carrier wave supplied to the control grid 327. From the amplifier 328, which may be replaced by balanced amplifiers, the reamplified modulated carrier wave may be transmitted for reception at the distant receiver 46.

Noise signals from the receiver 329 may also be fed to other relay or booster amplifiers such as 331 and 332 to eliminate noise signals from different modulated carrier waves received through tuned radio frequency amplifiers 333 and 334 from other transmitters, not shown. At 335 a non-modulated carrier wave may be transmitted for reception at receiver 63 to eliminate noise signals from the modulated carrier wave received in 46. It is to be understood that other relay stations similar to Figure 9 may be employed between the transmitter 45 and the receiver 46 to increase the distance that amplitude modulated carrier waves may be transmitted.

In wire line carrier wave systems as shown in Figure 1, relay stations similar to Figure 9 may be employed except that the radio frequency amplifiers 326, 333 and 334 may be replaced by filters and the receiver 329 would simply be a demodulator and filter arrangement to separate by demodulation any noise signals caused by static and cross modulation of other wire bound carrier waves which may be fed to an amplifier similar to 328 for retransmitting the message signal carrier wave.

Heretofore in booster stations for amplitude modulation, on account of interference from noise signals, the message signals have been separated by demodulation and remodulated on another carrier wave. In the present system I eliminate the effects of noise by the separation of noise signals received over a separate carrier wave and utilize these signals to make corrections for noise in one stage of reamplification for the modulated carrier wave.

Figure 10:
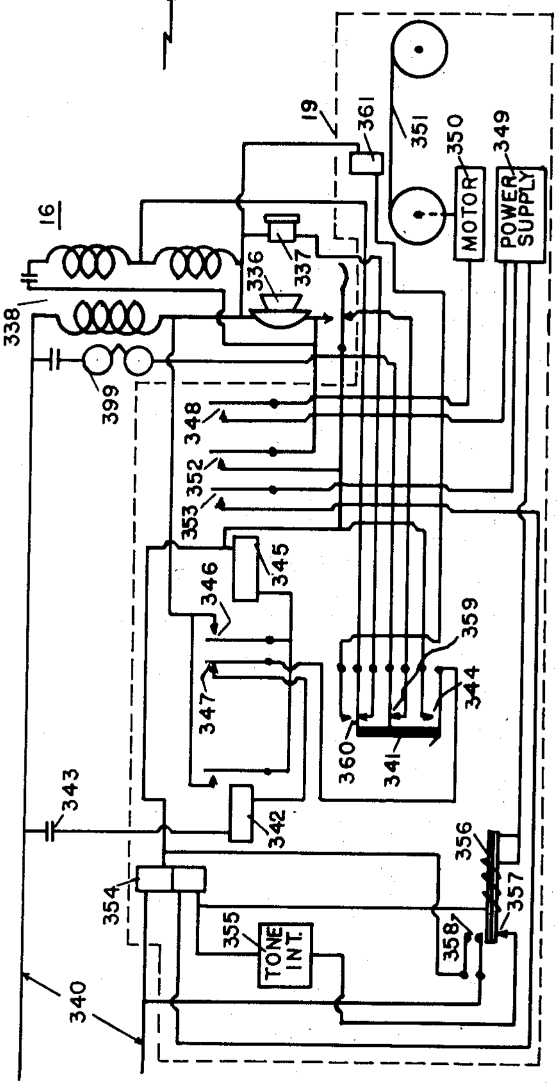
Figure 10 shows a telephone station and associated recording mechanism.

With reference to Figure 10, I have shown in more detail the telephone station 16 with its recording mechanism 19 whereby a message from a distant station may be recorded on a magnetic wire or tape for later audible reception. This recording mechanism, while primarily intended for interplant messages, may also be used for private or local office dictation.

The telephone station 16 may be of any standard type and comprises the microphone 336, receiver 337, a three winding transformer 338 and a bell 339; it is connected to a telephone line 340. The line 340 may be seized at the telephone office by the connector switch 155 for communication purposes as previously explained. The subscriber may actuate the key 341 so that the recording mechanism 19 may be connected to the line 340 in order to record any incoming message. Relay 342 may be bridged across the line 340 in series with the condenser 343 through key contacts 344. Ringing current transmitted over the line upon seizure by the connector 155, Figure 2, may energize relay 342. Relay 342 upon energizing closes a circuit for relay 345, in series with one winding of the transformer 338, which will now be energized over the line from battery through the connector switch. It is standard practice to connect battery to the called line through a connector switch upon removal of the receiver from the switch hook to bridge the microphone in series with one winding of transformer 338. Relay 345 upon energizing locks up through springs 346, until line circuit is opened by calling party replacing receiver, to be explained later, opens circuit for relay 342 at springs 347, and closes a circuit at spring 348 from the power supply 349 to the motor 350 for rotating the magnetic wire or tape 351.

Relay 345 upon energizing also completes at springs 352 a low impedance path for incoming signals and at springs 353 closes a circuit from the power supply 349 through one winding of induction coil 354 and the tone interrupter 355, which may be a relay interrupting its own energizing circuit, and winding of bi-metallic switch 356 in parallel. The interrupter causes a tone to be produced in the line winding of coil 354 to inform the calling party that he may proceed with dictation. The switch 356 after a short interval will open the interrupter circuit at contacts 357 and shunt the line winding of coil 354 at springs 358.

The key 341 in its operated position also opens at springs 359 the circuit for the bell 339, and spring 360 open circuit to receiver 337 and completes a circuit through recording coil 361, whereby any message signals received over the line may be recorded on the wire or tape 351.

The calling subscriber replacing his receiver on the switch hook will cause battery to be disconnected from the line 340 to in turn restore relay 345 and switch 356 to their normal position, whereby the recording mechanism is now ready for recording another call. The recording mechanism may be connected to any telephone line, and it may also be connected to an individual line, in which case the microphone, receiver, bell and key may not be required.

Figure 11 shows the telephone station 13, and in more detail the teletypewriter mechanism of Figure 1 for transmitting code signals. It is assumed that a communication path has been established between station 13 in office 1 and station 15 in office 2 as described in connection with Figures 4 and 5. The subscriber at station 13, after receiving the proper tone from the receiving station, may actuate key 362 to close a circuit at springs 363 from the power supply 364 to slow-to-release relay 365 and to the typewriter machine 366, thereby energizing relay 367. The teletypewriter 366 may now be actuated to interrupt the circuit of relay 367, according to the code for the different characters in the message to be transmitted, to interrupt the line circuit at springs 368 which was opened at key springs 369. Relay 365 may be energized through the break contacts of relay 367 and will remain energized to shunt station 13 during interruptions of the pulsing relay 367. The opening and closing of the line circuit according to the space and mark signals will cause the pulsing relays 174 Figure 4 and relay 218 Figure 5 to be actuated accordingly to retransmit the code signals in a manner similar to dial pulses. Therefore, a carrier wave communication path between offices may be utilized to transmit dial pulse signals and thereafter coded signals for printing mechanisms over one time division channel and signals representative of an audible message over a second time division channel.

Figure 12:
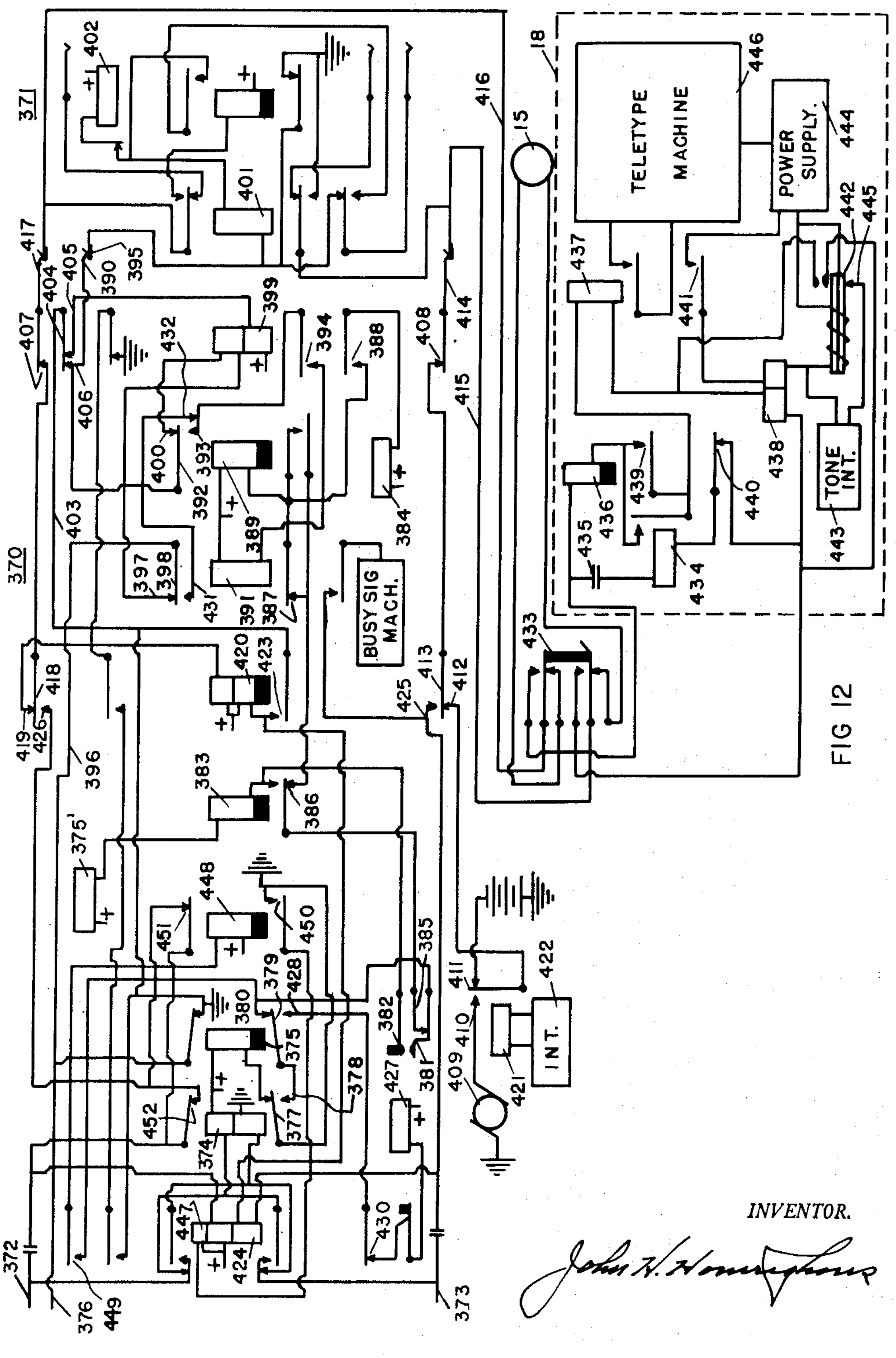
Figure 12 shows machine switching office equipment and a connected telephone line with teletypewriter and code signal receiving mechanism.

Referring to Figure 12, it shows a step by step connector switch 370 and a line switch 371 which may be the connector switch 50 illustrated in Figure 5, modified so that signals corresponding to space and mark printing telegraph codes, received after the connector has been actuated by dial pulse signals to select the desired station terminals, may be repeated or relayed to the called station for actuating printing mechanisms.

Assume that dial pulse signals previously received over line conductors 372 and 373 actuated the line relay 374 to in turn actuate the vertical and rotary magnets to cause the switch brushes to contact the line terminals for station 15. Line relay 374 upon energizing closes a circuit for slow relay 375 which retains its armature during pulsing of relay 374 or during interruptions in the line circuit. Relay 375 upon energizing grounds the private conductor 376 for maintaining the selectors 49, Figure 5, in their operated position. The line relay 374 responsive to line interruptions may actuate the magnet 375′ over a circuit from ground through springs 377 and 378, springs 379 and 380, off normal springs 381 and 382, winding of slow relay 383, and winding of magnet 375′ to battery. Relay 383 is energized in series with the vertical magnet and retains its armature during the vertical impulses, thereby preventing the opening of the vertical magnet circuit by the shifting of the off normal springs, which operation occurs as soon as the switch shaft, not shown, leaves normal position. The line relay 374 being operated by interruptions in the line circuit in accordance with the last digit in the number of the called station to in turn actuate the rotary magnet 384 over the following circuit: from ground through springs 377 and 378, springs 379 and 380, off normal springs 381 and 385, springs 386, 387, 388 and winding of rotary magnet 384 to battery, thereby rotating the switch brushes to the line terminals for station 15. It will be noted that a branch of the rotary magnet circuit extends through the winding of slow relay 389 to battery. It follows that the relay 389 will be energized in parallel with the rotary magnet during the rotation of the switch brushes or wipers and retains its armature attracted during the impulses to the rotary magnet. When the relay 389 is energized the private brush 390 is connected to the winding of the test relay 391 as follows: brush 390, springs 392 and 393, springs 394, winding of relay 391 to battery.

The switch wipers having been rotated into connection with the terminals of the desired line, the operations now depend upon whether or not that line is busy. Assuming the line to be idle, the test contact 395 will be clear of ground, the relay 391 will remain inoperative, and upon deenergization of relay 389 the following circuit will be closed: grounded conductor 396, springs 397 and 398, upper winding of relay 399, springs 400 and 392, brush 390, contact 395, winding of switching relay 401, and winding of rotary magnet 402 to battery. Relays 399 and 401 are energized in series, the latter operating to clear the line of substation 15 from battery and ground connections in the line switch. Relay 399 upon energizing, closes a locking circuit for itself by way of grounded conductor 403, springs 404 and 405, lower winding of relay 399 to battery. At the same time at springs 404 and 406 the conductor 403 is connected direct to the test brush 390. A further result of the energization of relay 399 is the closure of a signaling circuit at springs 407 and 408 which may be traced as follows: ground at generator, springs 410 and 411, springs 412 and 413, brush 414, line conductor 415, ringer at substation 15, not shown, but similar to the ringer at station 13, conductor 416, brush 417, springs 418 and 419, upper winding of relay 420 to battery. The relay 421 intermittently energized through an interrupter 422 substitutes booster battery for the generator. The ring cut off relay 420 is so adjusted that it will operate on current from the generator 410 and office battery in series when the direct current bridge is closed at the substation 15 by removal of the receiver, not shown, or on current from the office battery and the booster battery in series under the same condition; but it will not operate from generator current alone when a condenser is included in the bridge with the ringer.

When the subscriber at station 15 responds by removing his receiver, the relay 420 is energized at once irrespective of the position of the interrupter apparatus and locks itself over the following circuit: grounded conductor 403, springs 423, lower winding of relay 420 to battery. A branch of the above circuit supplies ground to the lower winding of the back bridge relay 424. The lower winding of relay 424 is connected as shown rather than to ground direct in order that the calling subscriber may hear tone by induction between the windings of relay 420 when ringing current is fed to the calling line. Relay 420 upon energizing disconnects its upper winding and the interrupter apparatus at springs 412 and 413, and springs 418 and 419, and at springs 413 and 425, and springs 418 and 426, completes the talking circuit through the connector. The backbridge relay is now energized in series over the called line circuit and reverses the direction of current flow through the office trunks to in turn operate relay 226, Figure 5.

By replacement of the receiver at the calling station the circuit of line relay 374 is broken. Upon deenergization, the line relay 374 breaks the circuit of slow acting relay 375, which in turn removes ground from the holding circuit extending back to the selector switches 49, Figure 5. The replacement of the receiver at station 15 allows relay 424 to deenergize, thereby closing a circuit for the release magnet 427 as follows: from ground through springs 377 and 378, springs 379 and 428, springs 430, off normal springs, winding of magnet 427. The energization of the release magnet results in the restoration of the connector to normal.

Assume that the station 15 was busy when called, in which case the test contact 395 would have a ground potential upon it. Under these circumstances when the brushes 390, 414 and 417 are rotated, relay 389 is energized during the rotation as previously described. Then as soon as the test brush 390 arrives at the contact 395, the relay 391 will be energized over a circuit previously traced with results which will now be pointed out. At springs 398 and 431 a locking circuit is prepared, which upon deenergization of relay 389 is completed over the following path: grounded conductor 376, springs 398 and 431, springs 432 and 393, springs 394, winding of relay 391 to battery. Relay 391 is thus locked in energized position until the connector is released. Relay 391 upon energizing connects a lead from the busy signaling machine to the line conductor 373. By the transmission of distinctive tone to the calling subscriber he is informed that the line which he is attempting to connect is busy.

I have described the operation of the standard connector switch 370 for establishing a communication path to a called subscriber's station to transmit thereto ringing current and thereafter signals representative of an audible message. The modification of this connector switch for repeating space and mark printing telegraph or teletypewriter signals to the called station will be described later.

At station 15 by the operation of the key 433 the teletypewriter mechanism 18 may be connected to the line instead of the telephone substation equipment when it is desired to utilize the machine switching mechanisms described above for teletypewriter messages. A relay 434 in series with a condenser 435 is bridged across the line and the relay 434 will be energized by ringing current transmitted from the connector 370. Relay 434 upon energizing completes a circuit for slow-acting relay 436 and pulsing relay 437 in series with one winding of coil 438 over the line conductors 415 and 416 and the two windings of back bridge relay 424 to battery and ground. Relay 436 upon energizing completes a locking circuit for itself at springs 439, and at springs 440 breaks the circuit of relay 434. Relay 437 upon energizing closes a circuit at springs 441 through the second winding of coil 438, winding of bimetallic switch 442 and tone interrupter 443 in parallel to the power supply 444. The interrupter 443 will produce by induction a tone in the line winding of coil 438 for a short period to inform the calling party that he may now transmit teletypewriter signals. The bimetallic switch after a short interval will flex and break the circuit of the tone interrupter at spring 445 and shunt the line winding of coil 438. Space and mark code signals transmitted over the line circuit will intermittently deenergize pulsing relay 437 to actuate the teletype machine 446 of conventional type.

The modification of the connector may comprise a holding winding 447 for the back bridge relay 424 and the addition of relay 448 and associated circuits. The relay 424 energized over the connected line circuit closes a circuit at springs 449 for the slow-acting relay 448 during further operation of line relay 374 over the following path: from ground through springs 377 and 378, springs 379 and 380, springs 449, winding of relay 448 to battery. Relay 448 upon energizing completes a circuit for holding the back bridge relay 424 operated during momentary interruptions in the line circuit extending to the teletypewriter mechanism over the following path: from ground through springs 450, winding 477 to battery. Relay 448 upon energizing opens the springs 451 to remove the shunt across springs 452 controlled by the line relay 374. Therefore, dial signals or space and mark signals produced in the calling line will cause the circuit of the line relay 374 to be similarly interrupted over a circuit previously traced, to in turn repeat these signals by interrupting the called line circuit through the backbridge relay 424 and the station apparatus comprising the relays 436 and 437. Relay 437 will be actuated according to the line interruptions to in turn control the teletype machine 446 in a well known manner.

The calling subscriber disconnecting his code signal sending mechanism from the line will cause deenergization of relay 374 to in turn deenergize relay 375 which is adjusted to retain its armature attracted for a relatively long period so that it will not be deenergized during reception of space teletype signals. Relay 375 upon deenergization breaks the circuit of relay 448 which is adjusted to retain its armature attracted for a relatively long period before closing the line circuit at springs 451. The time required for relay 375 to restore its armature to normal plus the time required for relay 448 to restore its armature to normal will permit deenergization of relay 436 to restore the relay and condenser bridge across the line to in turn cause deenergization of the back bridge relay 424, thereby restoring the connector to its normal condition. Spring contacts 451 are adjusted to make contact before spring contacts 450 open so that the circuit through the line windings of the back bridge relay will be closed before the circuit for the holding winding 474 is opened in order to prevent relay chatter when using the connector for regular telephone services and the called subscriber is the last to replace his receiver. This connector as above modified is used in connection with the recording mechanism described above.

From the above description it has been shown that an additional service may be provided by the improved connector switch 370 whereby the connector may be utilized for automatically extending a talking channel to a telephone station and for extending a message signal channel to a teletypewriter station. In the latter case the connector switch may be restored to normal position by the calling subscriber replacing his receiver.

In the various circuits shown and described I have simplified the drawings by indicating the source of potential in certain cases by a sign. Also I have omitted the heater filaments for the various tubes, but it will be understood that such filaments are necessary.

The embodiments of the invention which have been given herein are illustrations of ways the various features may be accomplished and of the principles involved. It is to be understood that the invention contained herein is capable of embodiment in many other forms and adaptations, without departing from the spirit of the invention and the scope of the appended claims.

Having thus described my invention, I claim:

1. In a communication system, a telephone office, a signal transmitter and a signal receiver associated with said office, means associated with said receiver to receive a carrier wave modulated with message signals, control signals and synchronizing signals, means associated with said transmitter to produce a second carrier wave, generator means associated with said transmitter and receiver under control of said received synchronizing signals to produce a plurality of recurring channel pulses, a microphone to produce other message signals representative of an audible message, a source of alternating current, signal path terminal equipment associated with said transmitter and receiver comprising a first incoming signal channel gate amplifier under control of a first one of said recurring channel pulses to receive said message signals from said receiver during a first recurring period of time, a second incoming signal channel gate amplifier under control of a second one of said recurring channel pulses to receive said control signals from said receiver during a second recurring period of time, a first outgoing signal channel gate amplifier under control of said first recurring channel pulse to control transmission of said other message signals, from said microphone, over said second carrier wave during said first recurring period and a second outgoing signal channel gate amplifier under control of a third one of said recurring channel pulses to control transmission of alternating current supervisory signals, from said source, over said second carrier wave during a third recurring period.

2. In a communication station, means to produce a first carrier wave, a trunk line in said station, a source of alternating current in said station, a first relay connected to said trunk line, said relay actuated by direct current over said line and responsive to dialing interruptions thereof for intermittent actuation, means associated with said trunk line to produce a plurality of recurring timing pulses, means associated with said trunk line including a first gate amplifier which is connected through contacts of said relay to said source of alternating current and under control of a first one of said recurring timing pulses to modulate said carrier wave, during a first recurring period of time, with control signals representative of said alternating current and said alternating current interrupted according as said relay is intermittently actuated, and a second gate amplifier under control of a second one of said recurring timing pulses to modulate said carrier wave, during a second recurring period, with message signals representative of communication signals received from said trunk line.

3. In a communication station, a trunk line in said station, means associated with said trunk line to produce a plurality of recurring timing pulses, a pulsing relay having contacts in a pulsing circuit forming a part of said trunk line, a control circuit for said relay including an electrical device, carrier wave receiver means associated with said trunk line including a first gate amplifier which is connected to said device and under control of a first one of said recurring timing pulses to receive, during a first recurring period of time, control signals representative of alternating current and dialing interruptions thereof to actuate said relay for intermittently opening said contacts to repeat the dialing interruptions in said pulsing circuit, and a second gate amplifier under control of a second one of said recurring timing pulses to receive, during a second recurring period, message signals representative of intelligence being transmitted for retransmission over said trunk line.

4. A communication station as claimed in claim 2, comprising in addition a second relay having contacts through which said first relay is connected to said line, a control circuit for said second relay including an electrical device, and carrier wave receiver means associated with said trunk line including a third gate amplifier which is connected to said device and under control of a third one of said recurring timing pulses to receive, during a third recurring period, supervisory signals to actuate said second relay for reversing the direction of current over said trunk line.

5. A communication station as claimed in claim 3, comprising in addition means to produce a carrier wave, a second relay connected in said trunk line, said second relay responsive to direct current of a certain polarity in said line, a source of alternating current in said station, and means associated with said trunk line including a third gate amplifier which is connected through contacts of said second relay to said source of alternating current and under control of a third one of said recurring timing pulses to modulate said carrier wave, during a third recurring period, with supervisory signals representative of said alternating current.

6. In a communication system, a first station, means at said station to produce a first carrier wave, a first trunk line in said station, a first source of alternating current in said station, a first relay connected to said trunk line, said relay actuated by direct current over said line and responsive to dialing interruptions thereof for intermittent actuation, means associated with said trunk line to produce a plurality of first recurring timing pulses, means associated with said trunk line including a first gate amplifier which is connected through contacts of said relay to said source of alternating current and under control of a first one of said recurring timing pulses to modulate said carrier wave, during a first recurring period of time, with control signals representative of said alternating current and said alternating current interrupted according as said relay is intermittently actuated, and a second gate amplifier under control of a second one of said recurring timing pulses to modulate said carrier wave, during a second recurring period, with message signals representative of communication signals received from said trunk line; a second station, a local trunk line in said second station, means associated with said local trunk line to produce a plurality of channel recurring timing pulses, a pulsing relay having contacts in a pulsing circuit forming a part of said local trunk line, a control circuit for said pulsing relay including a first electrical device, carrier wave means associated with said local trunk line including a third gate amplifier which is connected to said device and under control of a first one of said channel recurring timing pulses to receive, during said first recurring period, said control signals to actuate said pulsing relay for intermittently opening said contacts to repeat the dialing interruptions in said pulsing circuit, and a fourth gate amplifier under control of a second one of said channel recurring timing pulses to receive, during said second recurring period, said message signals for retransmission over said local trunk line; means at said second station to produce a second carrier wave, a second relay connected in said local trunk line, said second relay responsive to direct current of a certain polarity in said local trunk line, a second source of alternating current in said second station, means associated with said local trunk line including a fifth gate amplifier which is connected through contacts of said second relay to said second source of alternating current and under control of a third one of said channel recurring timing pulses to modulate said second carrier wave, during a third recurring period, with supervisory signals representative of alternating current from said second source, a third relay having contacts through which said first relay is connected to said first trunk line, a control circuit for said third relay including a second electrical device, and carrier wave receiver means associated with said first trunk line including a third gate amplifier which is connected to said second device and under control of a third one of said first recurring timing pulses to receive, during said third recurring period, said supervisory signals to actuate said third relay for reversing the direction of current over said first trunk line.

7. In a communication system, a first telephone office, a trunk line in said office, a source of alternating current in said office, a first relay connected to said trunk line, said relay actuated by direct current over said line and responsive to dialing interruptions thereof for intermittent actuation, means associated with said trunk line to produce a plurality of recurring timing pulses, means associated with said trunk line including a first gate amplifier which is connected through contacts of said relay to said source of alternating current and under control of a first one of said recurring timing pulses to transmit, during a first recurring period of time, control signals representative of said alternating current and said alternating current interrupted according as said relay is intermittently actuated, and a second gate amplifier under control of a second one of said recurring timing pulses to transmit, during a second recurring period, message signals representative of communication signals received from said trunk line; a second telephone office, a local trunk line in said second office, means associated with said local trunk line to produce a plurality of channel recurring timing pulses in synchronism with the said recurring timing pulses produced in said first office, a pulsing relay having contacts in a pulsing circuit forming a part of said local trunk line, a control circuit for said pulsing relay including an electrical device, and means associated with said local trunk line including a third gate amplifier which is connected to said device and under control of a first one of said channel recurring timing pulses to receive, during said first recurring period, said control signals to actuate said pulsing relay to intermittently open said contacts for repeating the dialing interruptions in said pulsing circuit, and a fourth gate amplifier under control of a second one of said channel recurring timing pulses to receive, during said second recurring period, said message signals for retransmission over said local trunk line.

8. In a communication system, a first telephone office, a source of alternating current in said office, a trunk line in said office, an operator's cord circuit detachably connected to said trunk line, a calling device associated with said cord circuit, means in said office to produce a plurality of first recurring timing pulses, a first gate amplifier associated with said trunk line, a first relay connected to said trunk line, said relay actuated by direct current over said trunk line and said cord circuit and responsive to dialing interruptions thereof according as said device is manipulated in accordance with digits in a telephone number to supply spaced alternating current signals from said source of alternating current to said gate amplifiers, and means associated with said trunk line including said first gate amplifier under control of a first one of said recurring timing pulses to transmit, during a first recurring period of time fragmentary portions of said spaced signals, and a second gate amplifier which is connected to said trunk line and under control of a second one of said recurring timing pulses for transmitting, during a second recurring period, message signals representative of communication signals received through said cord circuit.

9. A communication system as claimed in claim 8, comprising in addition a second telephone office, a local trunk line in said second office, means in said second office to produce a plurality of channel recurring timing pulses in synchronism with the said first recurring timing pulses, a pulsing relay having contacts in a pulsing circuit forming a part of said local trunk line, a control circuit for said pulsing relay including an electrical device, and means associated with said local trunk line including a third gate amplifier which is connected to said electrical device and under control of a first one of said channel recurring timing pulses to receive, during said first recurring period, said fragmentary portions of said spaced signals to actuate said pulsing relay for intermittently opening said contacts for repeating the dialing interruptions in said pulsing circuit, and a fourth gate amplifier under control of a second one of said channel recurring timing pulses for receiving, during said second recurring period, said message signals for retranmission over said local trunk line.

10. In a communication system, a first telephone office, a source of alternating current in said office, a calling station having a line terminating in said office, a calling device for said station, a plurality of like trunk lines in said office, a plurality of trunking switches in said office, means associated with said calling line including at least one of said trunking switches to select an idle one of said trunk lines for connection with said calling line, a first gate amplifier associated with said one trunk line, a first relay connected to said one trunk line, said relay actuated by direct current over said one trunk line and said calling line and responsive to dialing interruptions according as said device is manipulated in accordance with certain characters in a telephone number to supply spaced alternating current signals from said source to said gate amplifier, means in said office to produce a plurality of recurring timing pulses, and means associated with said trunk line including said first gate amplifier under control of a first one of said recurring timing pulses to transmit, during a first recurring period of time, fragmentary portions of said spaced signals, and a second gate amplifier which is connected to said one trunk line and under control of a second one of said recurring timing pulses for transmitting, during a second recurring period, message signals representative of incoming signals from the said calling station.

11. A communication system as claimed in claim 8, comprising in addition a second relay having contacts through which said first relay is connected to said trunk line, a control circuit for said second relay including an electrical device, and means associated with said trunk line including a third gate amplifier which is connected to said electrical device and under control of a third one of said recurring timing pulses for receiving, during a third recurring period, supervisory signals to actuate said second relay for reversing the direction of current over said cord circuit, and a supervisory alarm member associated with said cord circuit operatively responsive to said current reversal.

12. In a communication system, a first telephone office, a calling station having a line terminating in said office, a number of like signal path terminal equipments in said office, a plurality of trunking switches in said office, means associated with said line including at least one of said trunking switches to select an idle one of said terminal equipments for connection with said line, a first gate amplifier associated with said one terminal equipment, a first relay associated with said one terminal equipment, said relay actuated by direct current over said line and responsive to dialing interruptions thereof to supply dialing interrupted signals of alternating current from said source to said first gate amplifier, means in said office to produce a plurality of recurring timing pulses, means associated with all of the said terminal equipments to produce a first carrier wave, means associated with said one terminal equipment including said first gate amplifier under control of a first one of said recurring timing pulses to modulate said carrier wave during a first recurring period of time with fragmentary portions of said dialing interrupted signals, means associated with said one terminal equipment to produce a second carrier wave, and means to modulate said second carrier wave with first message signals incoming from said calling station.

13. A communication system as claimed in claim 12, comprising in addition a second relay having contacts through which direct current is supplied to said line, a control circuit for said second relay including an electrical device, and carrier wave receiver means associated with said one terminal equipment including a second gate amplifier which is connected to said electrical device and under control of a second one of said recurring timing pulses for receiving, during a second recurring period, supervisory signals to actuate said second relay for reversing the direction of current over said line.

14. In a communication system, a trunk line, a source of alternating current associated with said trunk line, a relay connected to said trunk line, said relay actuated by current over said line and responsive to dialing interruptions thereof for intermittent actuation, means associated with said trunk line to produce a plurality of recurring timing pulses and a recurring synchronizing pulse, and means associated with said trunk line including a first gate amplifier which is connected through contacts of said relay to said source and under control of a first one of said recurring timing pulses to transmit control signals representative of said alternating current interrupted according as said relay is intermittently actuated, a second gate amplifier which is connected to said trunk line and under control of a second one of said recurring timing pulses to transmit signals representative of message signals incoming over said trunk line, and a third gate amplifier under control of another one of said recurring timing pulses to transmit said recurring synchronizing pulse.

15. In a communication system, a telephone office, a trunk line in said office, a source of alternating current in said office, a first relay connected to said trunk line, said relay actuated by direct current over said line and responsive to dialing interruptions thereof for intermittent actuation, means associated with said trunk line to produce a plurality of recurring timing pulses, and means associated with said trunk line including a first gate amplifier which is connected through contacts of said relay to said source and under control of a first one of said recurring timing pulses to transmit, during a first recurring period of time, control signals representative of said alternating current and said alternating current interrupted according as said relay is intermittently actuated, and a second gate amplifier under control of a second one of said recurring timing pulses to transmit, during a second recurring period, message signals representative of communication signals received from said trunk line.

16. A communication system as claimed in claim 15, comprising in addition a second relay having contacts through which said first relay is connected to said line, a control circuit for said second relay including an electrical device, and means associated with said trunk line including a third gate amplifier which is connected to said device and under control of a third one of said recurring timing pulses to receive, during a third recurring period, supervisory signals to actuate said second relay for reversing the direction of current over said trunk line.

17. In a communication system, a telephone office, a local trunk line in said office, means associated with said trunk line to produce a plurality of recurring timing pulses, a pulsing relay having contacts in a pulsing circuit forming a part of said trunk line, a control circuit for said relay including an electrical device, means associated with said trunk line including a first gate amplifier which is connected to said device and under control of a first one of said recurring timing pulses to receive, during a first recurring period of time, control signals representative of alternating current and dialing interruptions thereof to actuate said relay to intermittently open said contacts for repeating the dialing interruptions in said pulsing circuit, and a second gate amplifier under control of a second one of said recurring timing pulses to receive, during a second recurring period, message signals representative of intelligence being transmitted for retransmission over said trunk line.

18. A communication system as claimed in claim 17, comprising in addition a second relay connected in said trunk line, said second relay responsive to direct current of a certain polarity in said line, a source of alternating current in said office, and means associated with said trunk line including a third gate amplifier which is connected through contacts of said second relay to said source of alternating current and under control of a third one of said recurring timing pulses to transmit, during a third recurring period, supervisory signals representative of said alternating current.

19. In a communication system, a first telephone office, a calling station having a line terminating in said office, a calling device for said station, a plurality of like trunk lines in said office, a plurality of trunking switches in said office, means associated with said calling line including at least one of said trunking switches to select an idle one of said trunk lines for connection with said calling line, a first gate amplifier associated with said one trunk line, a first relay connected to said one trunk line, said relay actuated by current over said one trunk line and said calling line and responsive to dialing interruptions thereof according as said device is manipulated in accordance with certain characters in a telephone number to supply spaced alternating current signals from said source to said first gate amplifier, means in said office to produce a plurality of recurring timing pulses, means associated with said trunk line including said first gate amplifier under control of a first one of said recurring timing pulses to transmit fragmentary portions of said spaced signals, and a second gate amplifier which is connected to said one trunk line and under control of a second one of said recurring timing pulses for transmitting first message signals representative of incoming signals from said calling station; a second relay having contacts through which said first relay is connected to said one trunk line, a control circuit for said second relay including an electrical device, and means associated with said one trunk line including a third gate amplifier which is connected to said electrical device and under control of a third one of said recurring timing pulses for receiving supervisory signals to actuate said second relay for reversing the direction of current over said calling line, and a fourth gate amplifier which is connected to said one trunk line and under control of said second recurring timing pulse to receive second message signals for retransmission to said calling line.

20. A communicating system as claimed in claim 17, comprising in addition a called station having a wire line terminating in said telephone office, message recording mechanism at said station, means including a train of trunking switches responsive to the dialing interruptions in said pulsing circuit to interconnect said trunk line and said wire line, and means including a relay at said station responsive to ringing current incoming over said wire line to cause a tone to be momentarily transmitted over said wire line and to cause said mechanism to be connected to said wire line for recording said message signals incoming from said trunk line.

21. A communication system as claimed in claim 17, comprising in addition a called station having a wire line terminating in said telephone office, a teletype machine at said station, a line relay having contacts in a control circuit connected to said machine, means including a train of trunking switches responsive to the dialing interruptions in said pulsing circuit to interconnect said trunk line and said wire line, and means including a second relay at said station responsive to ringing current incoming over said wire line to cause a tone to be momentarily transmitted over said wire line and to connect said line relay to said wire line, said line relay responsive to teletyping interruptions received in said control signals and repeated in said wire line to cause said machine to reproduce a teletyped message.

22. A communication system as claimed in claim 2, comprising in addition means at said station to produce a second carrier wave, means to transmit said second carrier wave non-modulated, a second station, an electron tube, first receiver means at said second station to receive said first carrier wave with said control signals, said message signals and first interference signals transmitted from other sources of radio frequency energy, means to apply the said control signals, said message signals and said first interference signals to a first grid in said tube, second receiver means at said second station to receive said second carrier wave with second interference signals from said other sources of radio frequency energy, said second interference signals substantially like said first interference signals, means to apply said second interference signals to a second grid in said tube in reverse phase relative to the phase in which said first interference signals are applied to said first grid to free substantially said control signals and said message signals of said first interference signals.

23. In a communication system, a telephone office, a trunk line in said office, a source of alternating current in said office, a relay connected to said trunk line, said relay actuated by current in said line and responsive to dialing interruptions thereof for intermittent actuation, means associated with said trunk line to produce a plurality of recurring timing pulses, means associated with said trunk line including a first gate amplifier having a control grid connected through contacts of said relay to said source and under control of a first one of said recurring timing pulses to transmit, during a first recurring period of time, control signals representative of said alternating current and said alternating current interrupted according as said relay is intermittently actuated, and a second gate amplifier which is connected to said trunk line and under control of a second one of said recurring timing pulses to transmit, during a second recurring period, message signals representative of communication signals received from said trunk line.

24. In a communication system, a telephone office, a local trunk line in said office, means associated with said trunk line to produce a pluraility of recurring timing pulses, a relay having normally open contacts in a pulsing circuit extension of said trunk line, a control circuit for said relay including an electrical device, means associated with said trunk line including a first gate amplifier having its output circuit connected to said device and under control of a first one of said recurring timing pulses to receive, during a first recurring period of time, control signals representative of alternating current and dialing interruptions thereof to actuate said relay for intermittently opening said contacts to repeat the dialing interruptions in said pulsing circuit, and a second gate amplifier which is connected to said trunk line and under control of a second one of said recurring timing pulses to receive, during a second recurring period, message signals representative of intelligence being transmitted for retransmission over said trunk line.

25. In a communication system, a telephone office, a trunk line in said office, a source of alternating current in said office, a first relay connected to said trunk line, said relay actuated by current over said line and responsive to dialling interruptions thereof for intermittent actuation, means associated with said trunk line to produce a plurality of recurring timing pulses, means associated with said trunk line including a first gate amplifier which is connected through contacts of said relay to said source and under control of a first one of said recurring timing pulses to transmit, during a first recurring period of time, control signals representative of said alternating current interrupted according as said relay is intermittently actuated, and a second gate amplifier which is connected to said trunk line and under control of a second one of said recurring timing pulses to transmit, during a second recurring period, first message signals representative of communication signals incoming from said trunk line; a supervisory relay for said trunk line, a control circuit for said supervisory relay including an electrical device, an operative member associated with said trunk line, and means associated with said trunk line including a third gate amplifier which is connected to said device and under control of a third one of said recurring timing pulses for receiving, during a third recurring period, supervisory signals to actuate said supervisory relay for controlling said member, and a fourth gate amplifier which is connected to said trunk line and under control of said second recurring timing pulse for receiving, during said second recurring period, second message signals for outgoing signal transmission over said trunk line.

26. In a communication system, a telephone office, a signal path terminal equipment in said office, means in said office to produce a plurality of recurring timing pulses, a pulsing relay having contacts in a pulsing circuit extending from said terminal equipment, a control circuit for said relay including an electrical device, first carrier wave receiver means associated with said terminal equipment including a gate amplifier which is connected to said device and under control of a first one of said channel recurring timing pulses to receive, during a first recurring period, dialing interrupted signals of alternating current to actuate said relay for intermittently opening said contacts, thereby repeating the dialing interruptions in said pulsing circuit, and second carrier wave receiver means to receive signals representative of a message for retransmission from said terminal equipment.

27. A communication system as claimed in claim 12, including in addition a second relay having contacts through which direct current is supplied to said line, a control circuit for said second relay including an electrical device, first carrier wave receiver means associated with said one terminal equipment including a second gate amplifier which is connected to said electrical device and under control of a second one of said recurring timing pulses for receiving, during a second recurring period, supervisory signals to actuate said second relay for reversing the direction of current over said line and second carrier wave receiver means associated with said one terminal equipment for receiving second message signals for transmission over said line to said calling station.

28. A communication system as claimed in claim 12, including in addition a supervisory relay for said one terminal equipment, a control circuit for said supervisory relay including an electrical device, an operative member associated with said one terminal equipment, first carrier wave receiver means associated with said one terminal equipment including a second gate amplifier which is connected to said electrical device and under control of a second one of said recurring timing pulses for receiving, during a second recurring period, supervisory signals to actuate said supervisory relay for controlling said member, and second carrier wave receiver means associated with said one terminal equipment for receiving second message signals for transmission over said line to said calling station.

29. A communication system as claimed in claim 10, comprising in addition a second relay having contacts through which said first relay is connected to said one trunk line, a control circuit for said second relay including an electrical device, and means associated with said one trunk line including a third gate amplifier which is connected to said electrical device and under control of a third one of said recurring timing pulses for receiving, during a third recurring period, supervisory signals to actuate said second relay for reversing the direction of current over said calling line, and message registering mechanism associated with the said calling line operatively responsive to said current reversal.

JOHN H. HOMRIGHOUS.

References Cited in the file of this patent

UNITED STATES PATENTS

| Number | Name | Date |
|---|---|---|
| 1,079,760 | Gustafson | Nov. 25, 1913 |
| 1,428,155 | Espenschied | Sept. 5, 1922 |
| 1,568,194 | Smythe | Jan. 5, 1926 |
| 1,572,756 | Smythe et al. | Feb. 9, 1926 |
| 1,579,256 | Smythe | Apr. 6, 1926 |
| 1,632,078 | Jammer | June 14, 1927 |
| 1,688,453 | Demarest et al. | Oct. 23, 1928 |
| 1,688,454 | Demarest et al. | Oct. 23, 1928 |
| 1,873,785 | Ranger | Aug. 23, 1932 |
| 1,902,187 | Saunders | Mar. 21, 1933 |
| 1,904,164 | Morton | Apr. 18, 1933 |
| 1,914,570 | Jenkins | June 20, 1933 |
| 2,048,081 | Riggs | July 21, 1936 |
| 2,052,051 | Lomax | Aug. 25, 1936 |
| 2,064,905 | Green | Dec. 22, 1936 |
| 2,104,635 | Breedlove | Jan. 4, 1938 |
| 2,107,168 | Tidd | Feb. 1, 1938 |
| 2,137,023 | Mank | Nov. 15, 1938 |
| 2,340,599 | Kinkead et al. | Feb. 1, 1944 |
| 2,374,842 | Shively et al. | May 1, 1945 |
| 2,383,541 | Gillings | Aug. 28, 1945 |
| 2,393,272 | Van Deventer | Jan. 22, 1946 |
| 2,395,467 | Deloraine | Feb. 26, 1946 |
| 2,396,884 | Robinson | Mar. 19, 1946 |
| 2,408,462 | Wise | Oct. 1, 1946 |
| 2,434,697 | Homrighous | Jan. 20, 1948 |
| 2,434,698 | Homrighous | Jan. 20, 1948 |
| 2,437,027 | Homrighous | Mar. 2, 1948 |
| 2,437,118 | Ostline | Mar. 2, 1948 |
| 2,454,498 | Bartelink | Nov. 23, 1948 |
| 2,457,434 | Bartelink | Dec. 28, 1948 |
| 2,468,059 | Grieg | Apr. 26, 1949 |
| 2,472,705 | Homrighous | June 7, 1949 |
| 2,542,991 | Chatterjea et al. | Feb. 27, 1951 |
| 2,557,392 | Potts | June 19, 1951 |